US010800085B2

(12) United States Patent
Kozar et al.

(10) Patent No.: US 10,800,085 B2
(45) Date of Patent: Oct. 13, 2020

(54) APPARATUSES FOR SHAPING AN EXTRUDABLE MATERIAL

(71) Applicant: The Boeing Company, Chicago, IL (US)

(72) Inventors: Michael Patrick Kozar, Mercer Island, WA (US); Mark S. Wilenski, Mercer Island, WA (US); Samuel F. Harrison, Lynnwood, WA (US); Faraon Torres, Everett, WA (US)

(73) Assignee: The Boeing Company, Chicago, IL (US)

( * ) Notice: Subject to any disclaimer, the term of this patent is extended or adjusted under 35 U.S.C. 154(b) by 433 days.

(21) Appl. No.: 15/636,342

(22) Filed: Jun. 28, 2017

(65) Prior Publication Data

US 2019/0001544 A1    Jan. 3, 2019

(51) Int. Cl.
| | | |
|---|---|---|
| *B29C 48/30* | (2019.01) | |
| *B29C 48/31* | (2019.01) | |
| *B29C 48/325* | (2019.01) | |
| *B29C 48/05* | (2019.01) | |
| *B29C 48/25* | (2019.01) | |
| *B29L 31/34* | (2006.01) | |

(52) U.S. Cl.
CPC ............ *B29C 48/05* (2019.02); *B29C 48/25* (2019.02); *B29C 48/302* (2019.02); *B29C 48/31* (2019.02); *B29C 48/325* (2019.02); *B29L 2031/3462* (2013.01)

(58) Field of Classification Search
CPC ....... B29C 48/05; B29C 48/302; B29C 48/31; B29C 48/313; B29C 48/325; B29C 48/327

See application file for complete search history.

(56) References Cited

U.S. PATENT DOCUMENTS

| | | | | |
|---|---|---|---|---|
| 3,840,311 A | * | 10/1974 | Wight | A23G 3/2015 425/131.1 |
| 4,124,351 A | * | 11/1978 | Garbuio | B29C 48/30 425/532 |
| 5,110,518 A | * | 5/1992 | Halter | B29C 48/30 264/40.1 |
| 2011/0081453 A1 | * | 4/2011 | Axelrod | B29O 43/222 426/62 |
| 2016/0288395 A1 | | 10/2016 | Shen et al. | |

FOREIGN PATENT DOCUMENTS

WO    2016072549    5/2016

* cited by examiner

*Primary Examiner* — Xiao S Zhao
*Assistant Examiner* — Joseph S Leyson
(74) *Attorney, Agent, or Firm* — Kunzler Bean & Adamson

(57) ABSTRACT

An apparatus for shaping an extrudable material comprises a sleeve, comprising a first sleeve end, a sleeve inlet at the first sleeve end, a second sleeve end, opposite the first sleeve end, and a sleeve outlet at the second sleeve end. The extrudable material enters the sleeve through the sleeve inlet and exits the sleeve through the sleeve outlet. The apparatus further comprises an actuation mechanism, selectively operable to change at least one of a size or a shape of the sleeve outlet. The sleeve is sufficiently flexible to enable the actuation mechanism to change at least one of the size or the shape of the sleeve outlet. The sleeve is insufficiently stretchable to enable the actuation mechanism to stretch the sleeve.

20 Claims, 18 Drawing Sheets

APPARATUSES FOR SHAPING AN EXTRUDABLE MATERIAL

TECHNICAL FIELD

The present disclosure relates to apparatuses and methods for shaping an extrudable material delivered to a workpiece.

BACKGROUND

It is commonplace to use extrusion tools, e.g., nozzles, for delivering extrudable materials, such as 3D-printing materials or sealants, to a workpiece. The shape of the extrudate delivered from each extrusion tool is fixed. Accordingly, to change the shape of the extrudate, delivered to the workpiece, one extrusion tool must be replaced with another during the extrusion cycle, negatively impacting design freedom and increasing manufacturing cycle time.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for shaping an extrudable material. The apparatus comprises a sleeve. The sleeve comprises a first sleeve end, a sleeve inlet at the first sleeve end, a second sleeve end, opposite the first sleeve end, and a sleeve outlet at the second sleeve end. The extrudable material enters the sleeve through the sleeve inlet and exits the sleeve through the sleeve outlet. The apparatus further comprises an actuation mechanism, selectively operable to change at least one of a size or a shape of the sleeve outlet. The sleeve is sufficiently flexible to enable the actuation mechanism to change at least one of the size or the shape of the sleeve outlet. The sleeve is insufficiently stretchable to enable the actuation mechanism to stretch the sleeve.

Use of sleeve and actuation mechanism provide adjustment to the size and/or shape of extrudable material exiting sleeve outlet during a manufacturing process, such as an additive manufacturing method. The ability to adjust the size and/or shape of extrudable material from a single apparatus facilitates the formation of self-supporting, out-of-plane structures using additive manufacturing methods without the need to substitute one apparatus (e.g., nozzle) for another. In other words, selective operation of actuation mechanism to change the size and/or the shape of sleeve outlet facilitates on-the-fly changes to the size and/or the shape of extrudable material extruded from sleeve outlet in an additive manufacturing process. Additionally, use of sleeve and actuation mechanism allows additive manufacturing processes to form parts with higher material throughput, reduced material usage, improved interlaminar adhesion, faster print speeds, better part geometry, better surface control, and reduced post-processing steps. Furthermore, sleeve, being both flexible and non-stretchable, promotes changes to the size and/or the shape of extrudable material, while not allowing the pressure of extrudable material to deform sleeve, which facilitates predictable and controllable flow rates of extrudable material from sleeve.

Another example of the subject matter according to the invention relates to a method of shaping an extrudable material. The method comprises advancing the extrudable material through a sleeve that comprises a second sleeve end and sleeve outlet at the second sleeve end. The method further comprises selectively changing at least one of a size or a shape of the sleeve outlet.

The ability to selectively change the size and/or the shape of sleeve outlet facilitates adjustment of the size and/or shape of extrudable material delivered from a single apparatus, which promotes the formation of self-supporting, out-of-plane structures using additive manufacturing methods without the need to substitute one nozzle for another. In other words, selective changing of the size and/or the shape of sleeve outlet facilitates on-the-fly changes to the size and/or the shape of extrudable material extruded from sleeve outlet in an additive manufacturing process. Additionally, selectively changing at least one of the size or the shape of sleeve outlet allows additive manufacturing processes to form parts with higher material throughput, reduced material usage, improved interlaminar adhesion, faster print speeds, better part geometry, better surface control, and reduced post-processing steps. Furthermore, sleeve, being both flexible and non-stretchable, promotes changes to the size and/or the shape of extrudable material, while not allowing the pressure of extrudable material to deform sleeve, which facilitates predictable and controllable flow rates of extrudable material from sleeve.

BRIEF DESCRIPTION OF THE DRAWINGS

Figure 1:
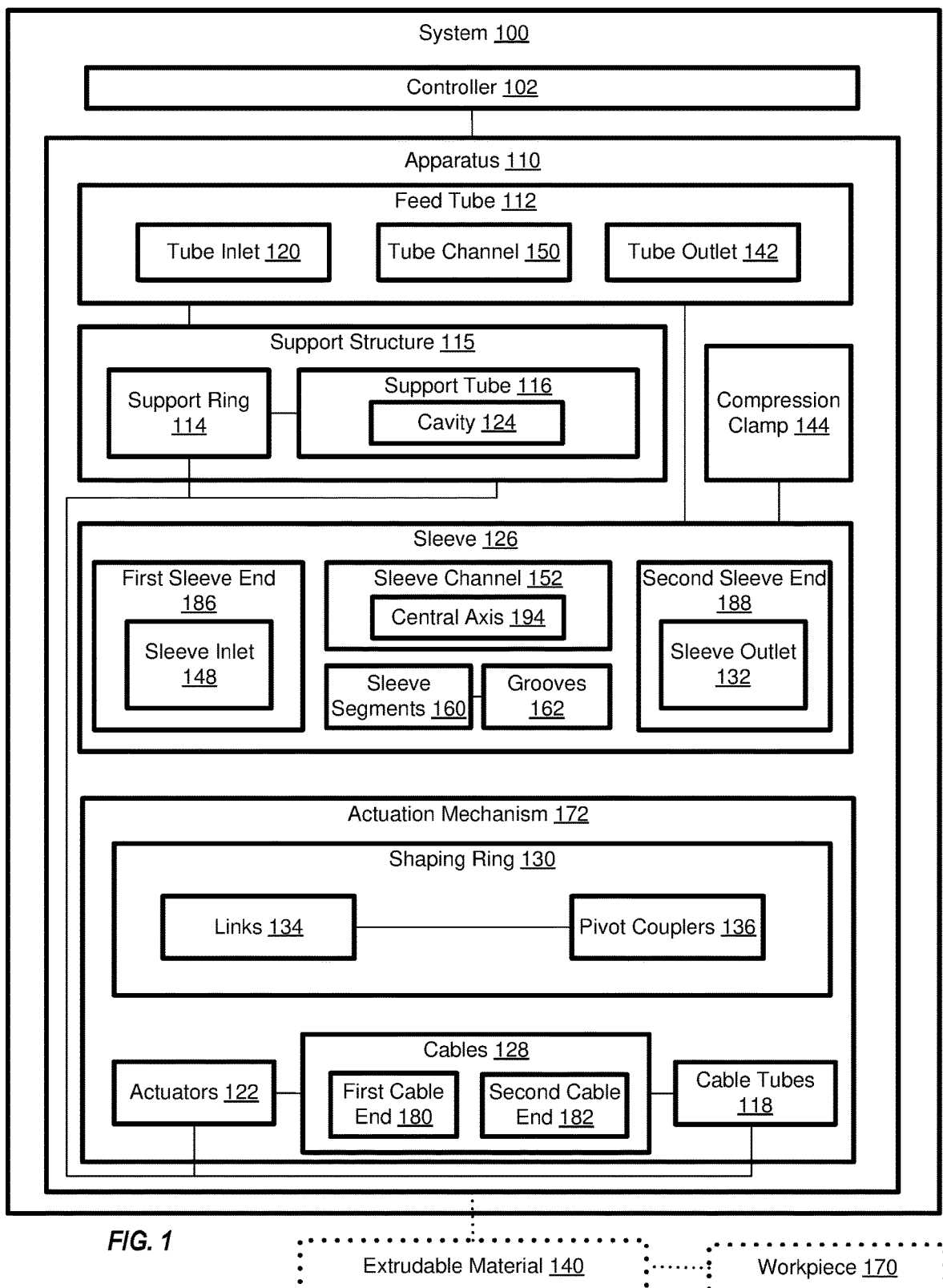
Figure 2:
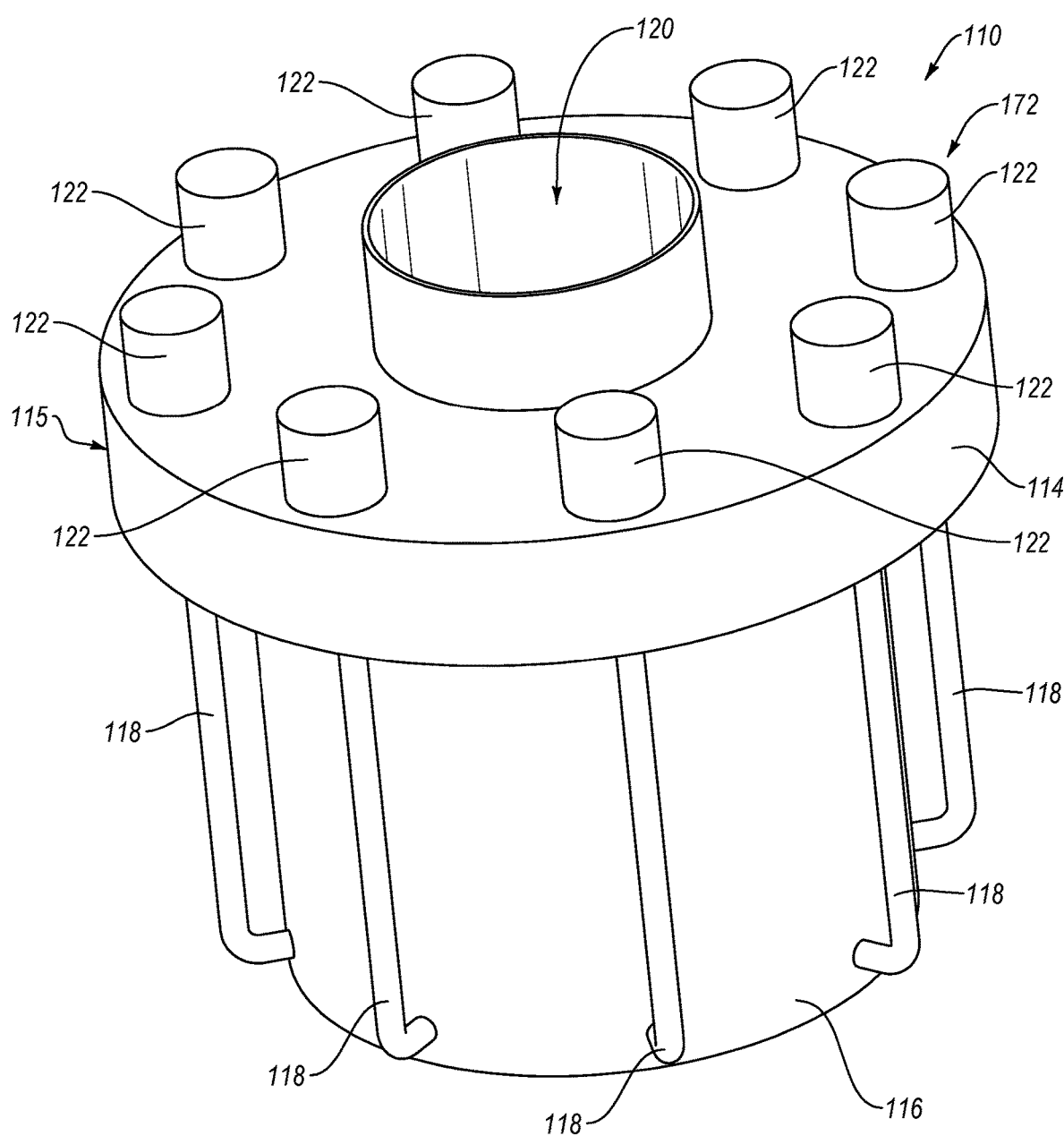
Figure 3:
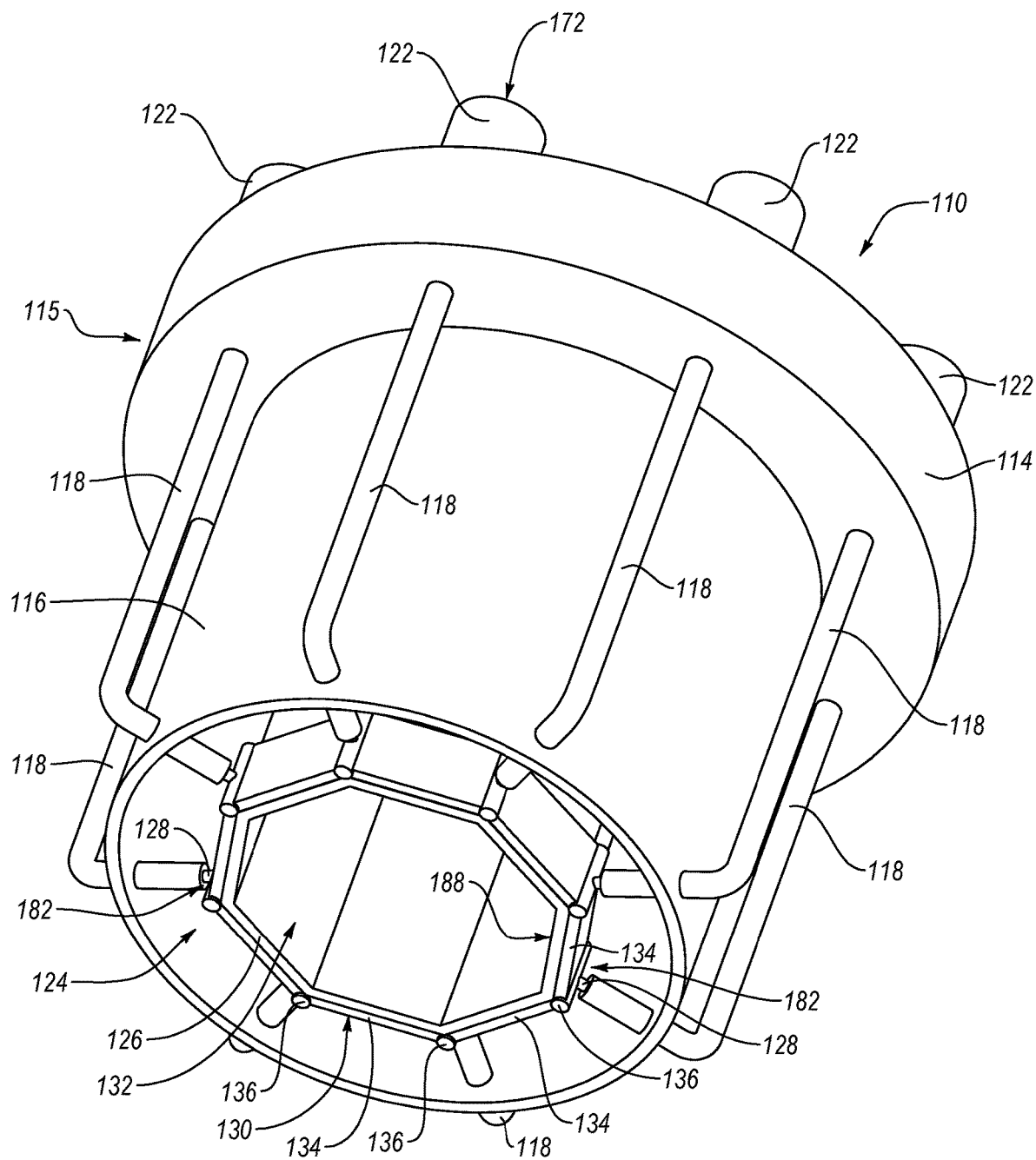
Figure 4:
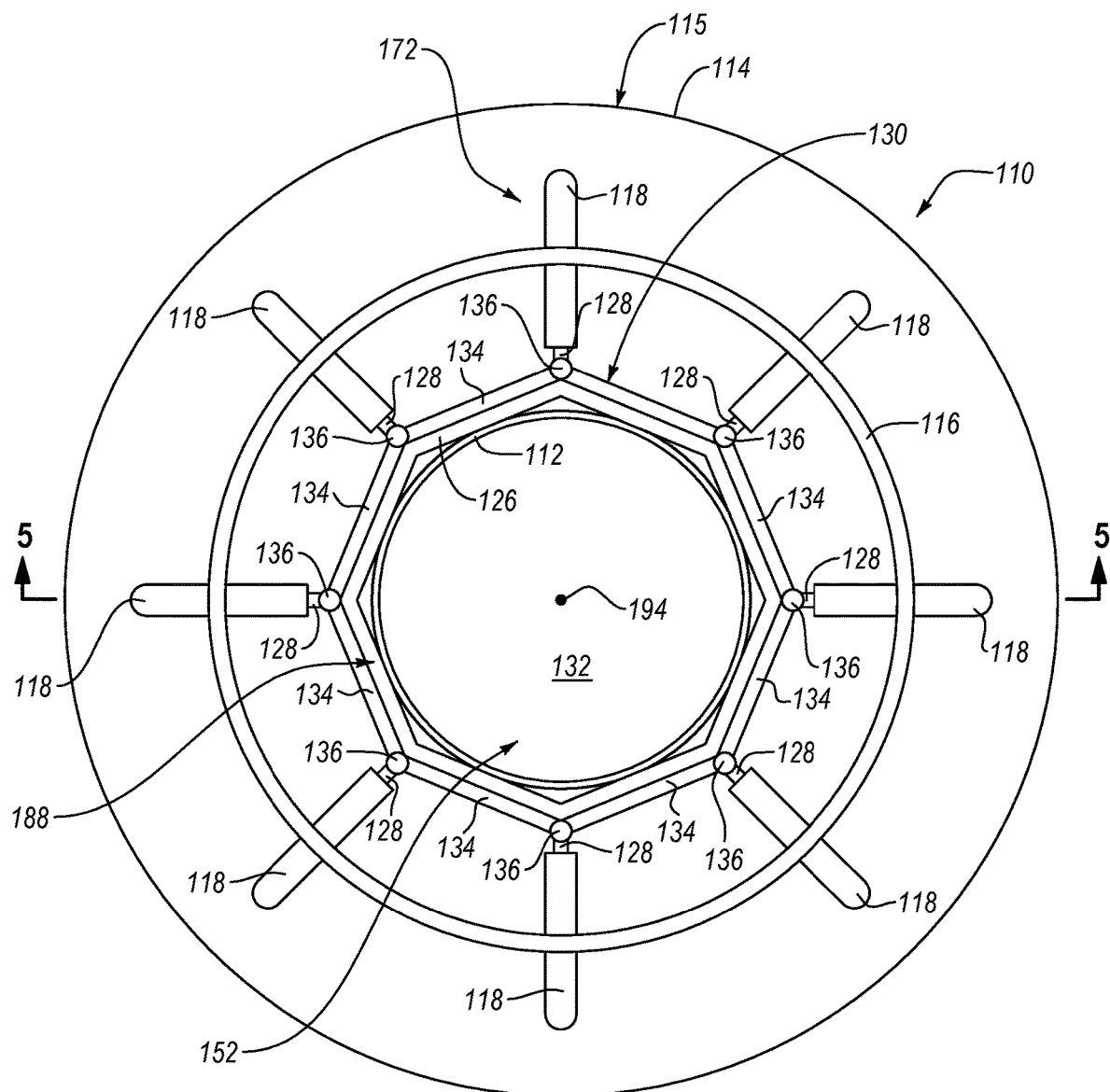
Figure 5:
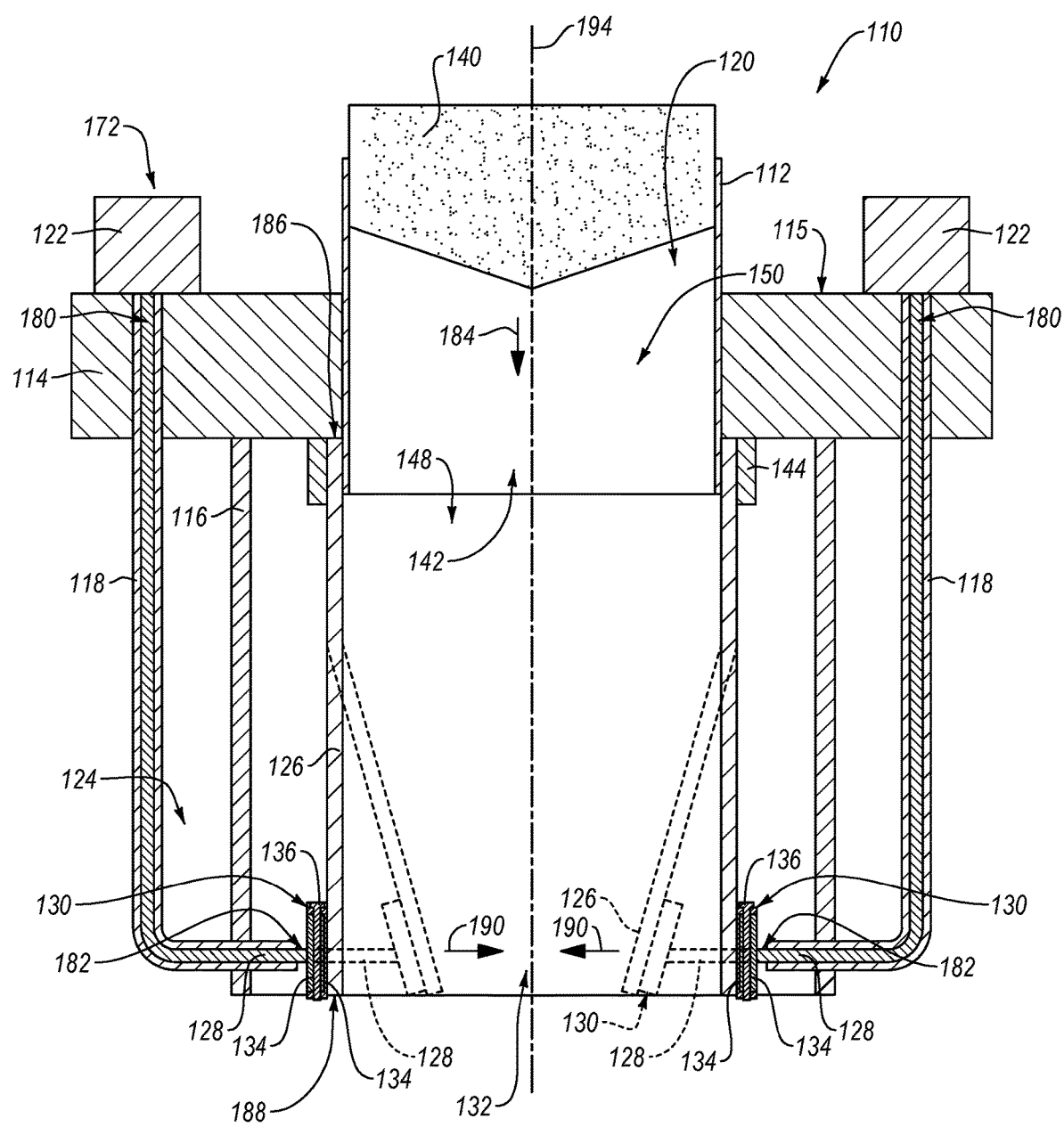
Figure 6:
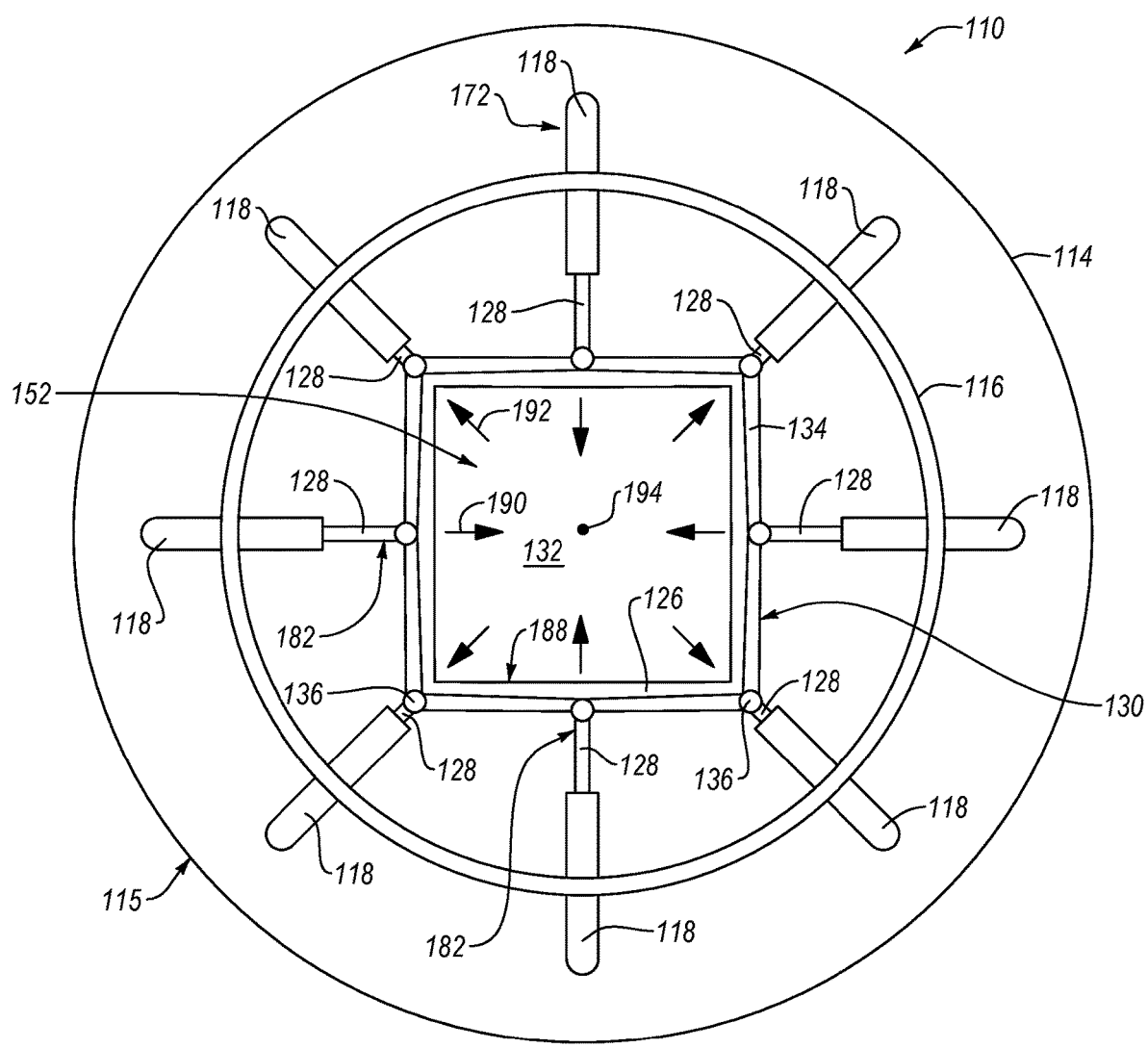
Figure 7:
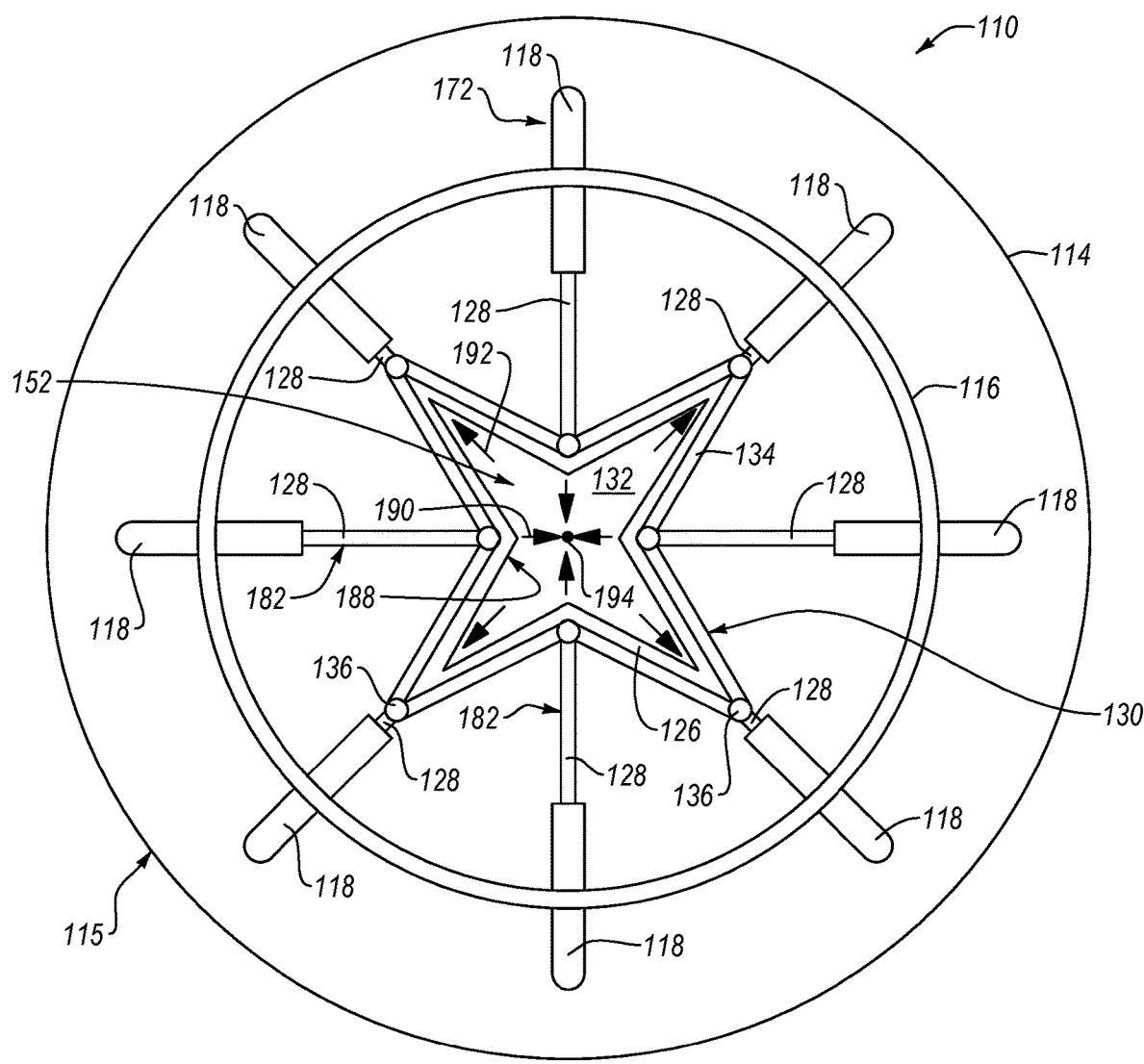
Figure 8:
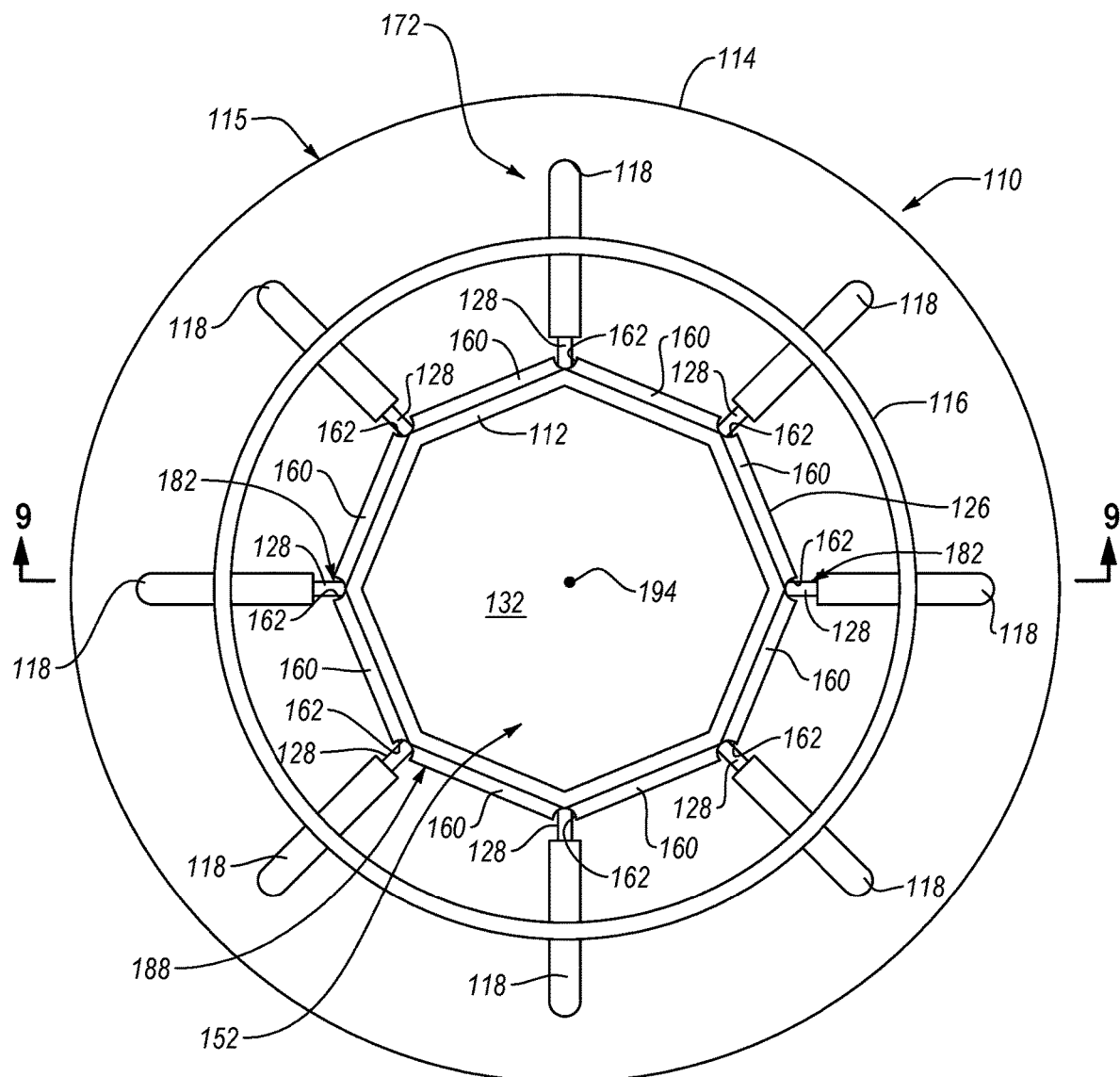
Figure 9:
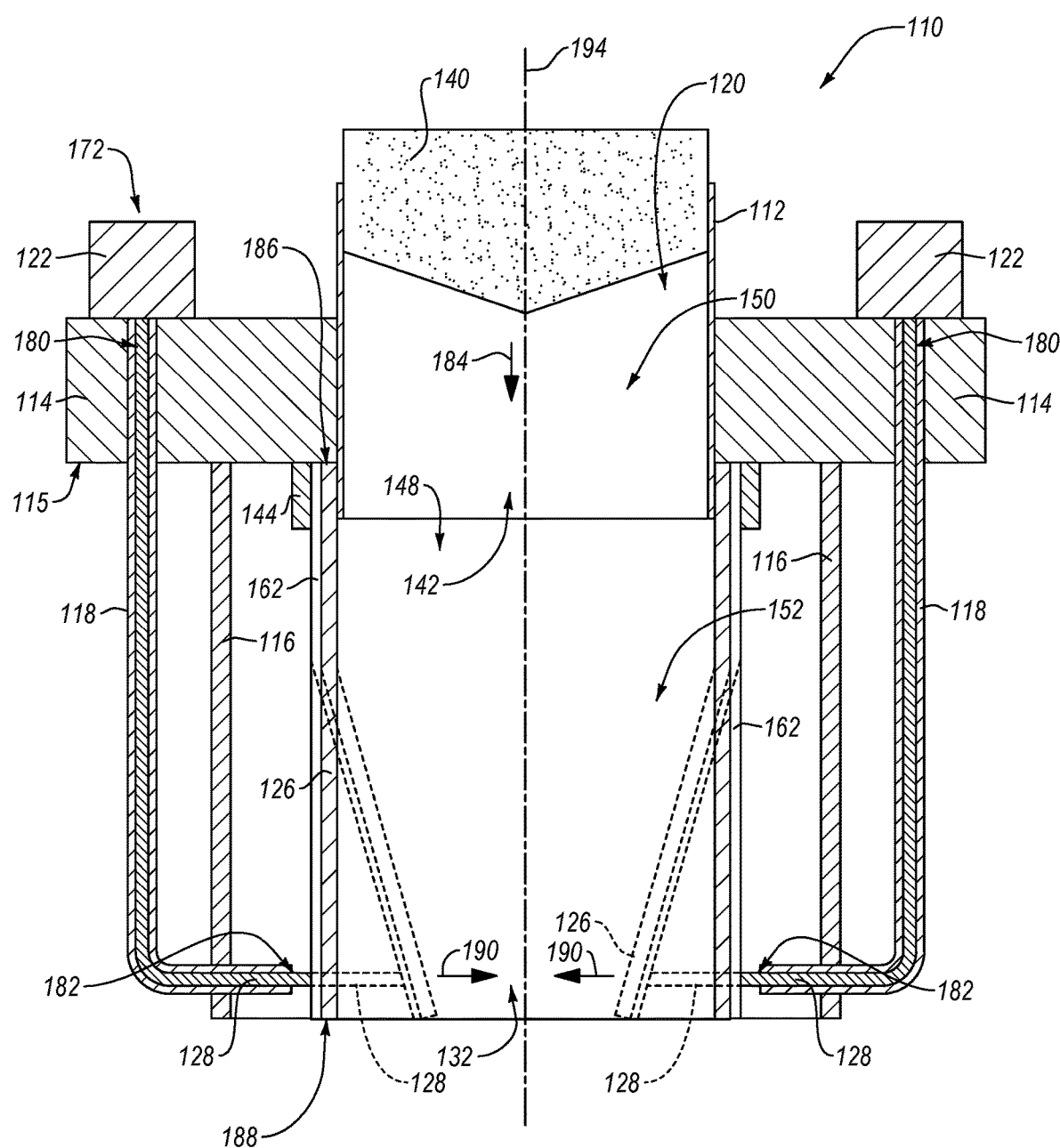
Figure 10:
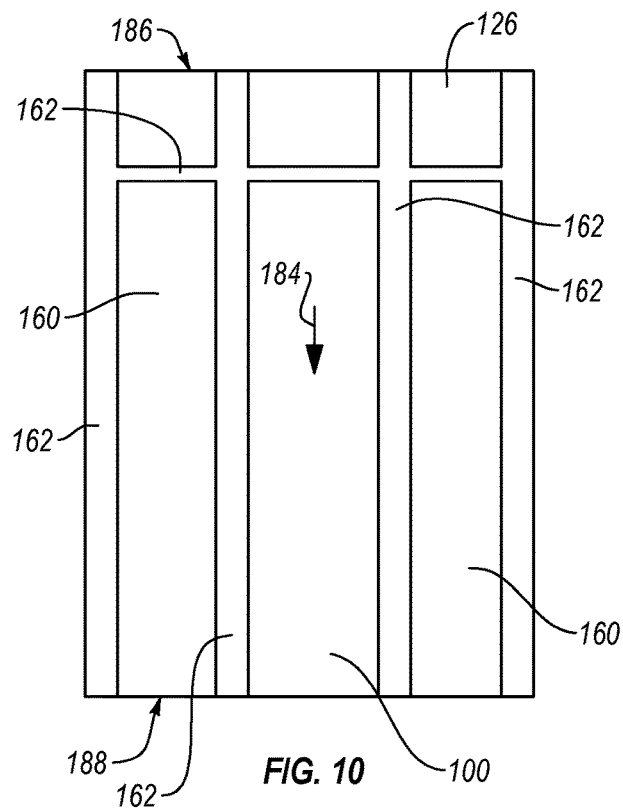
Figure 11:
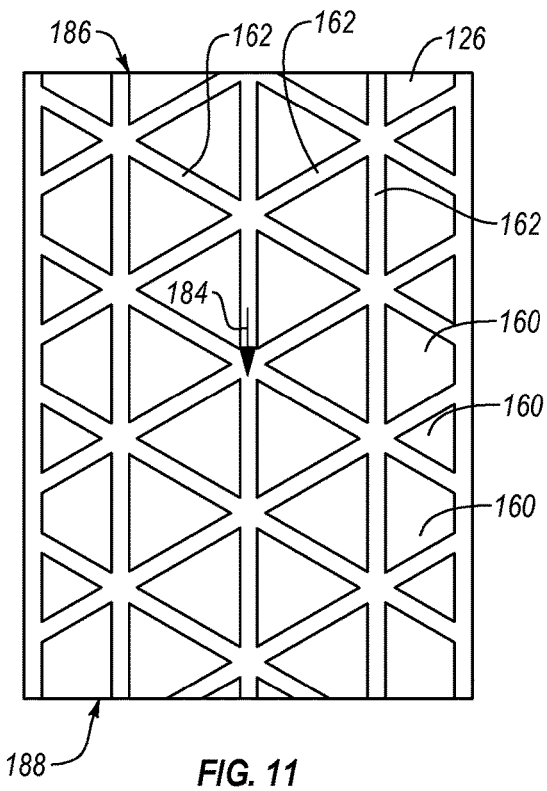
Figure 12:
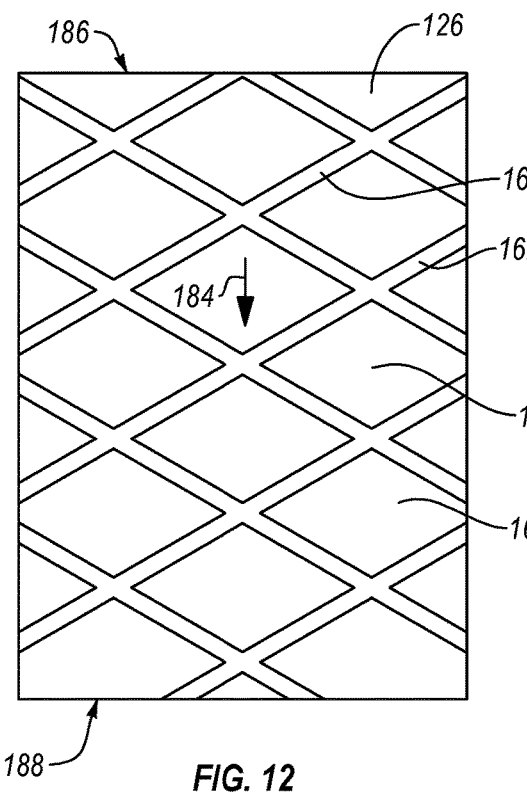
Figure 13:
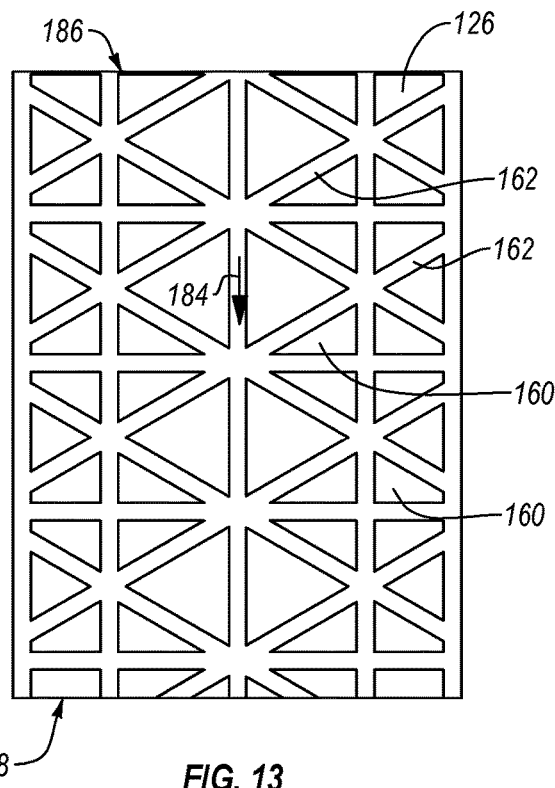
Figure 14:
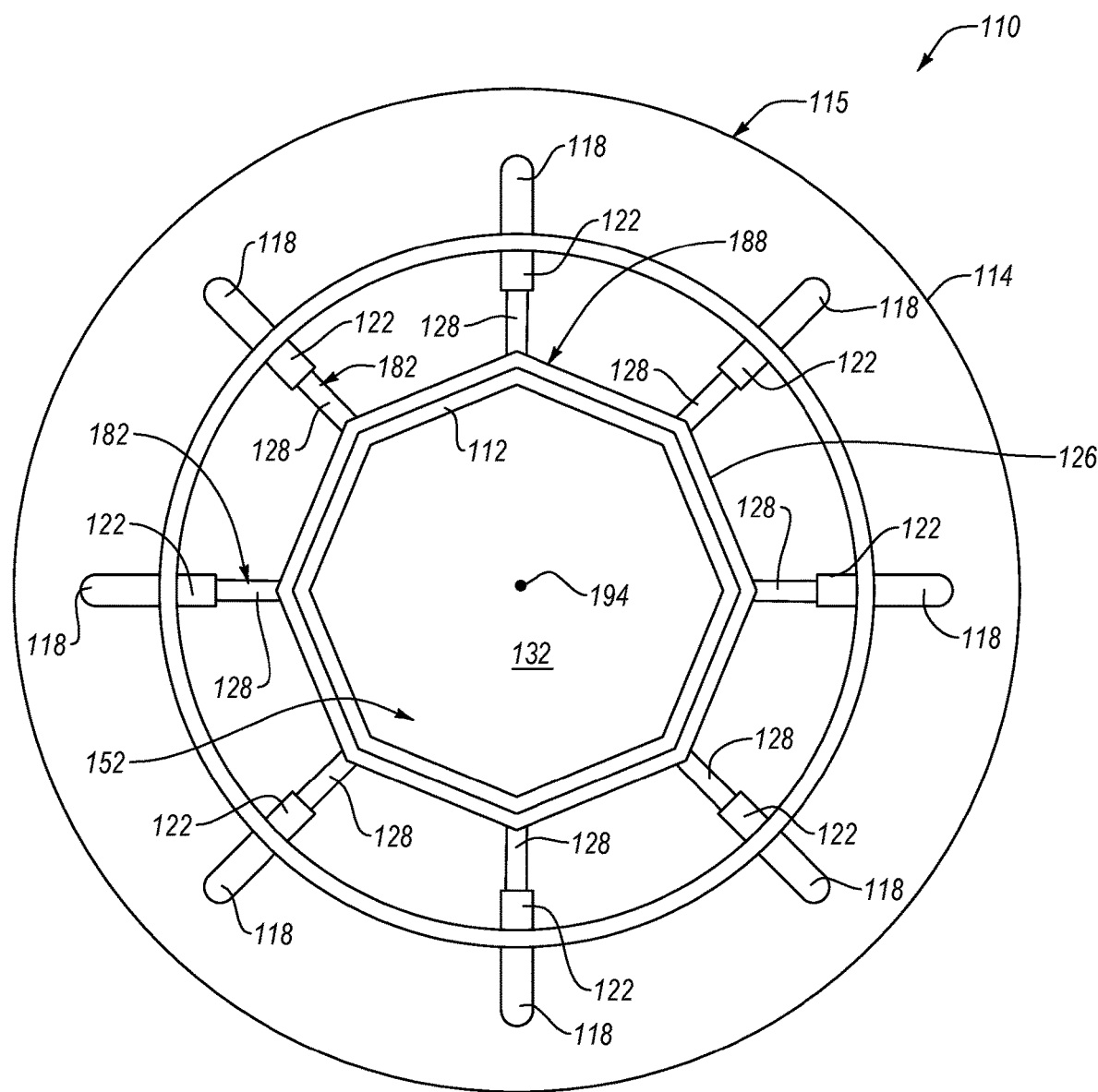
Figure 15:
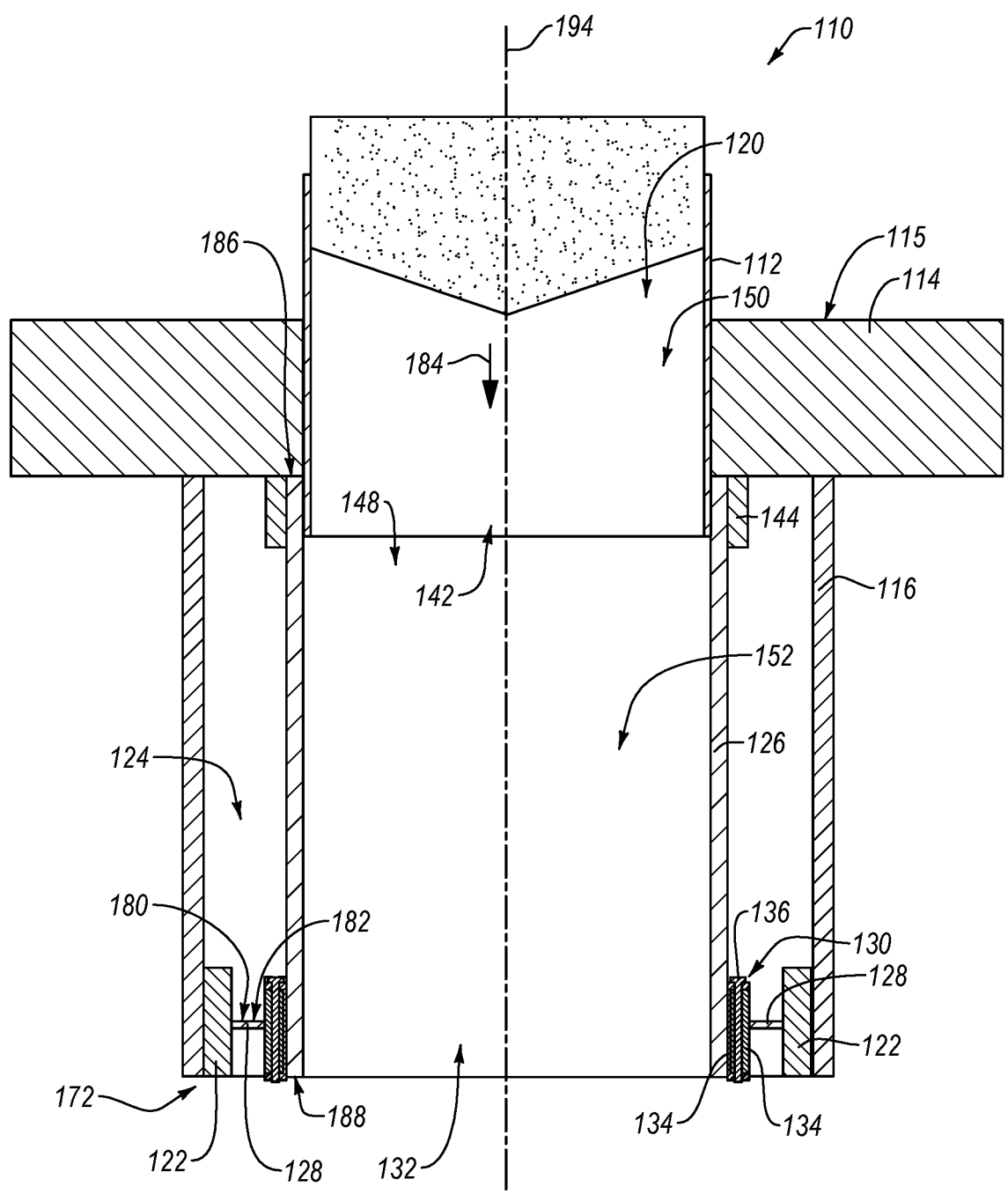
Figure 16:
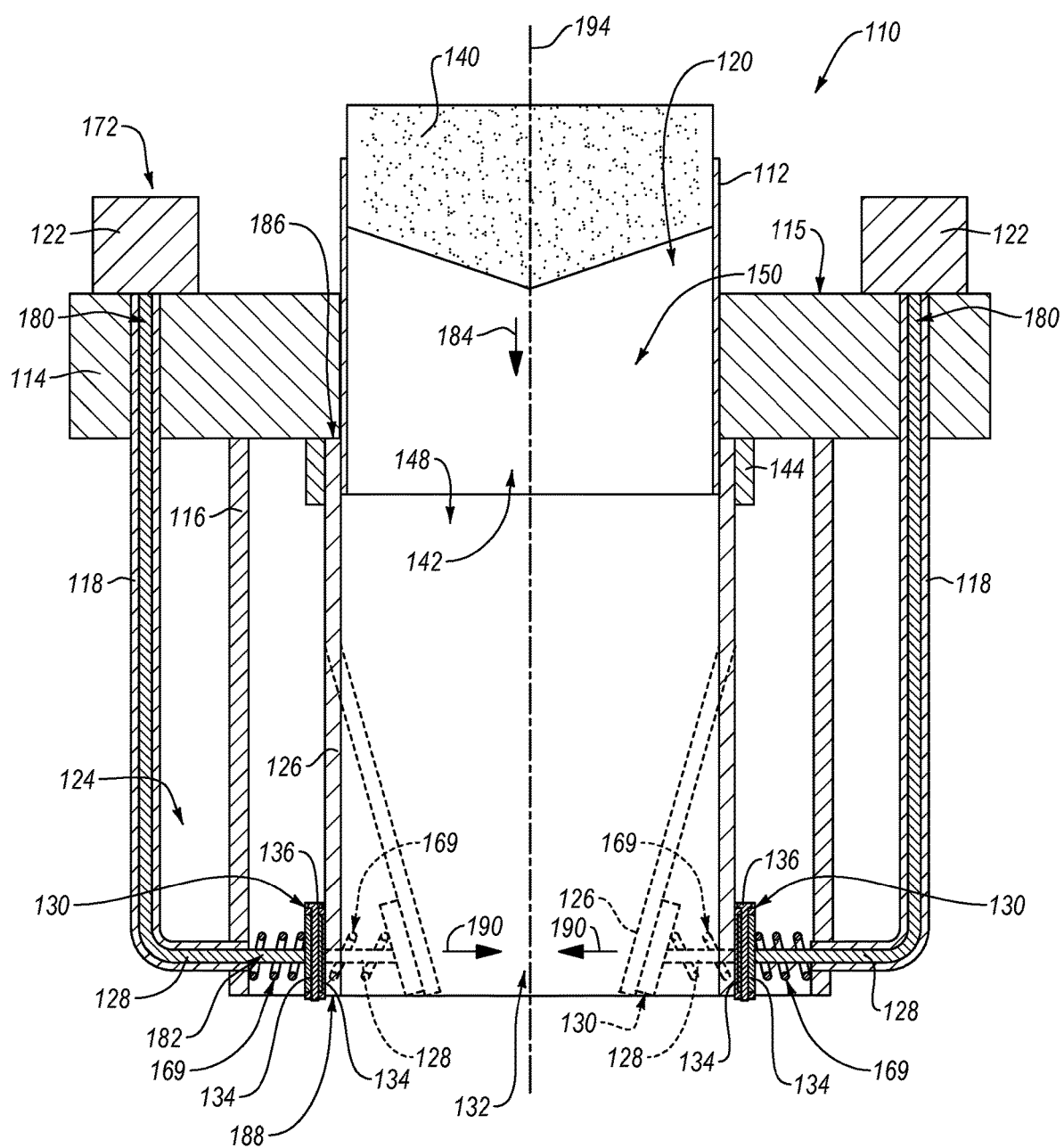
Figure 17:
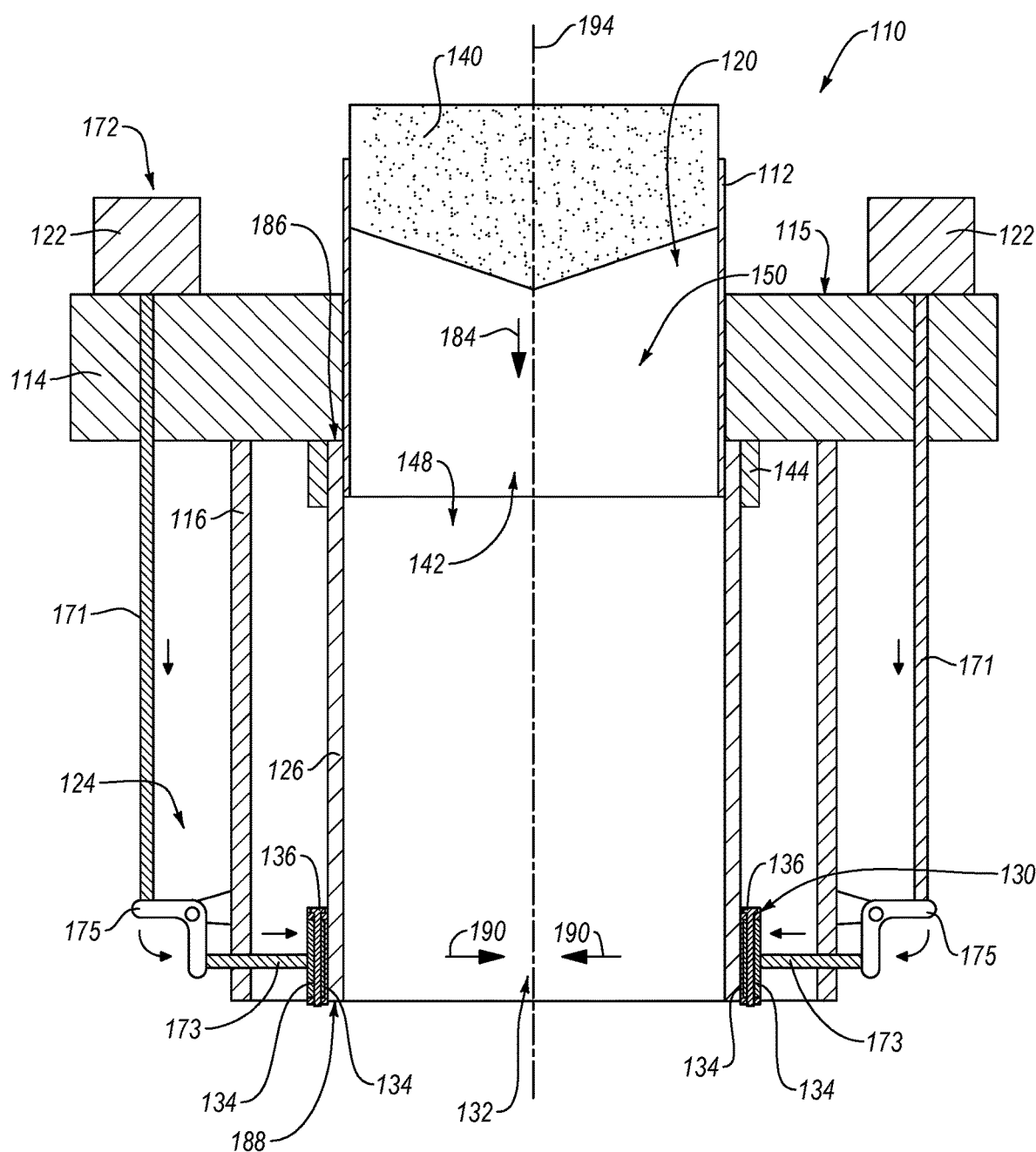
Figure 18:
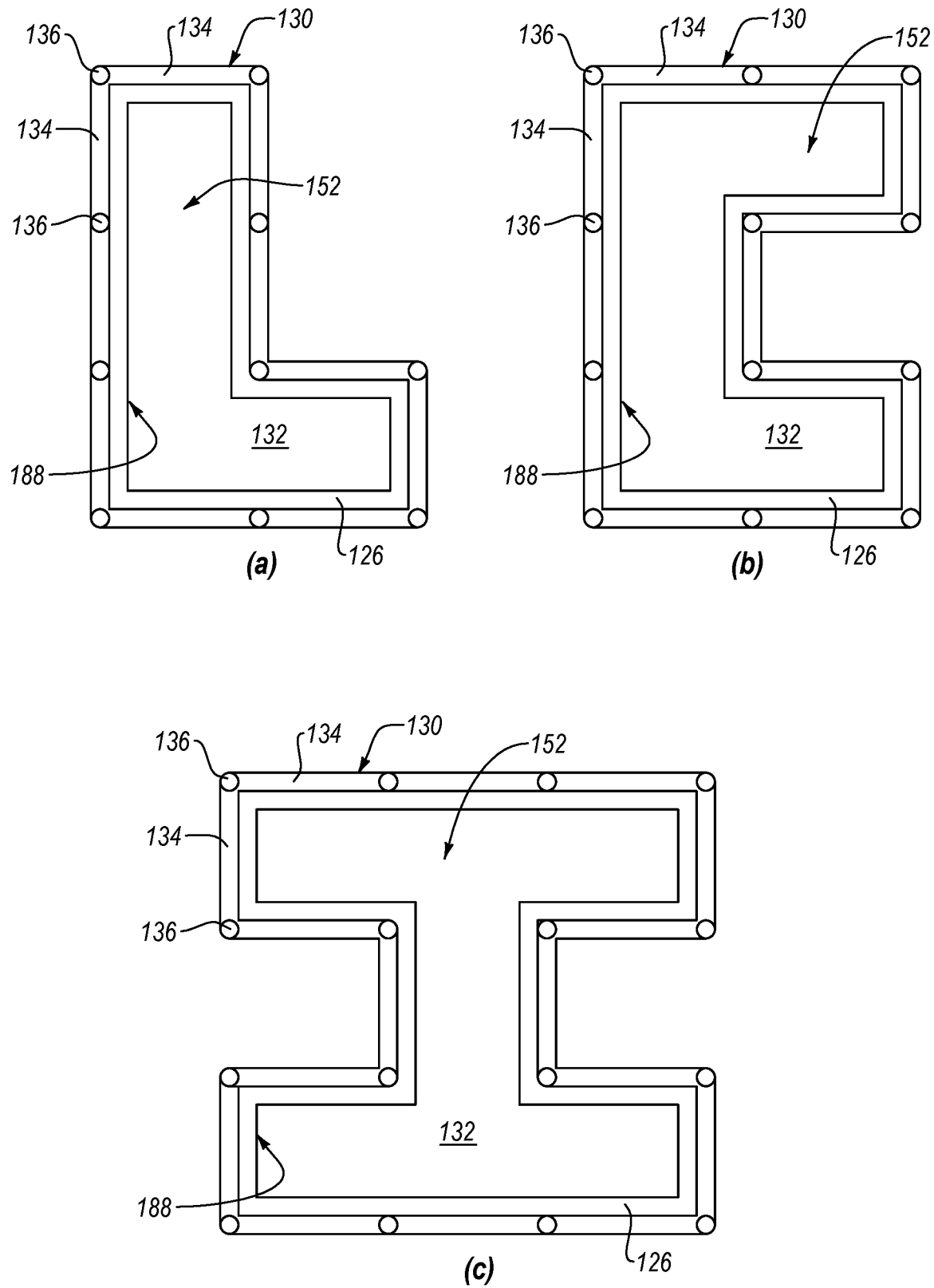
Figure 19:
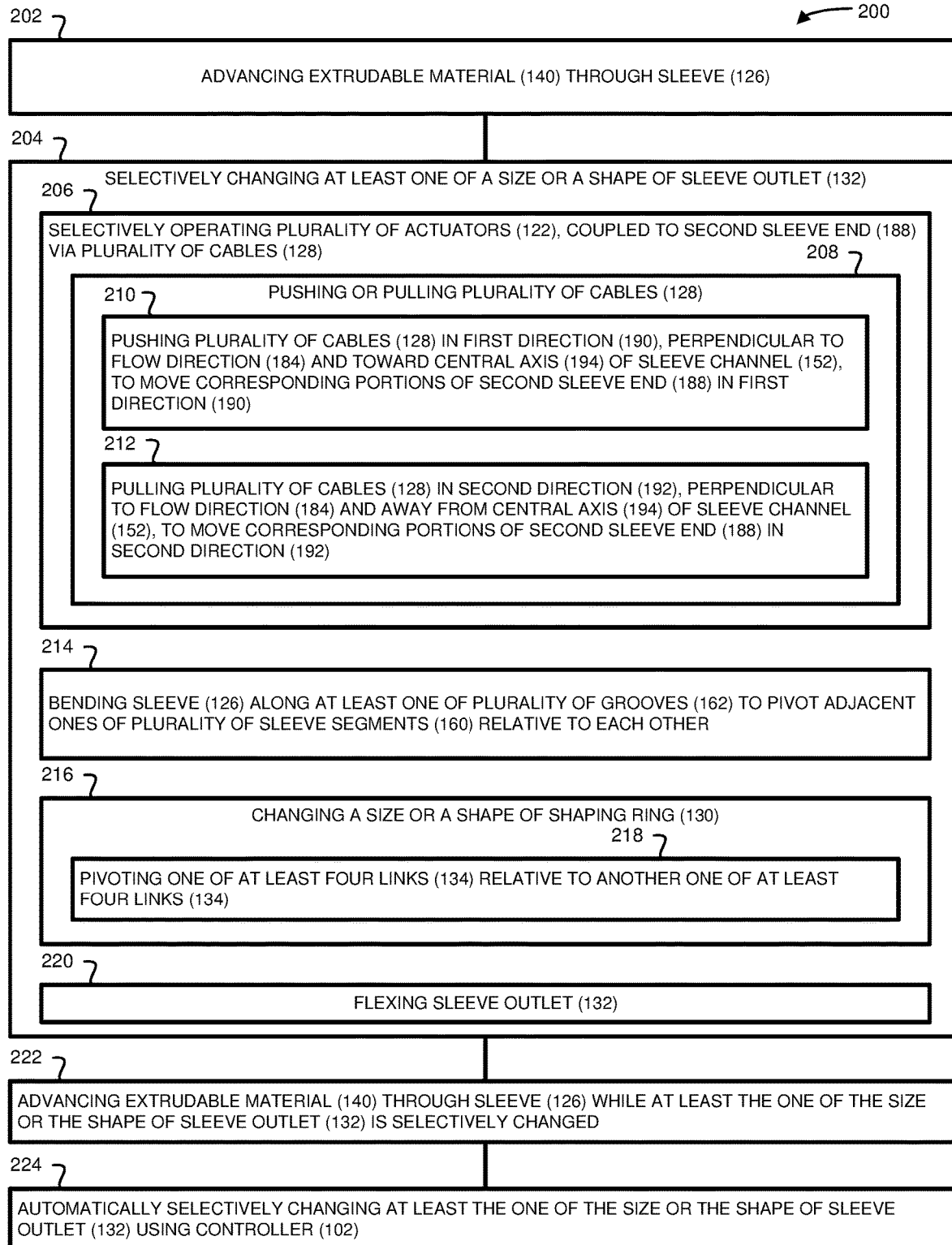
Figure 20:
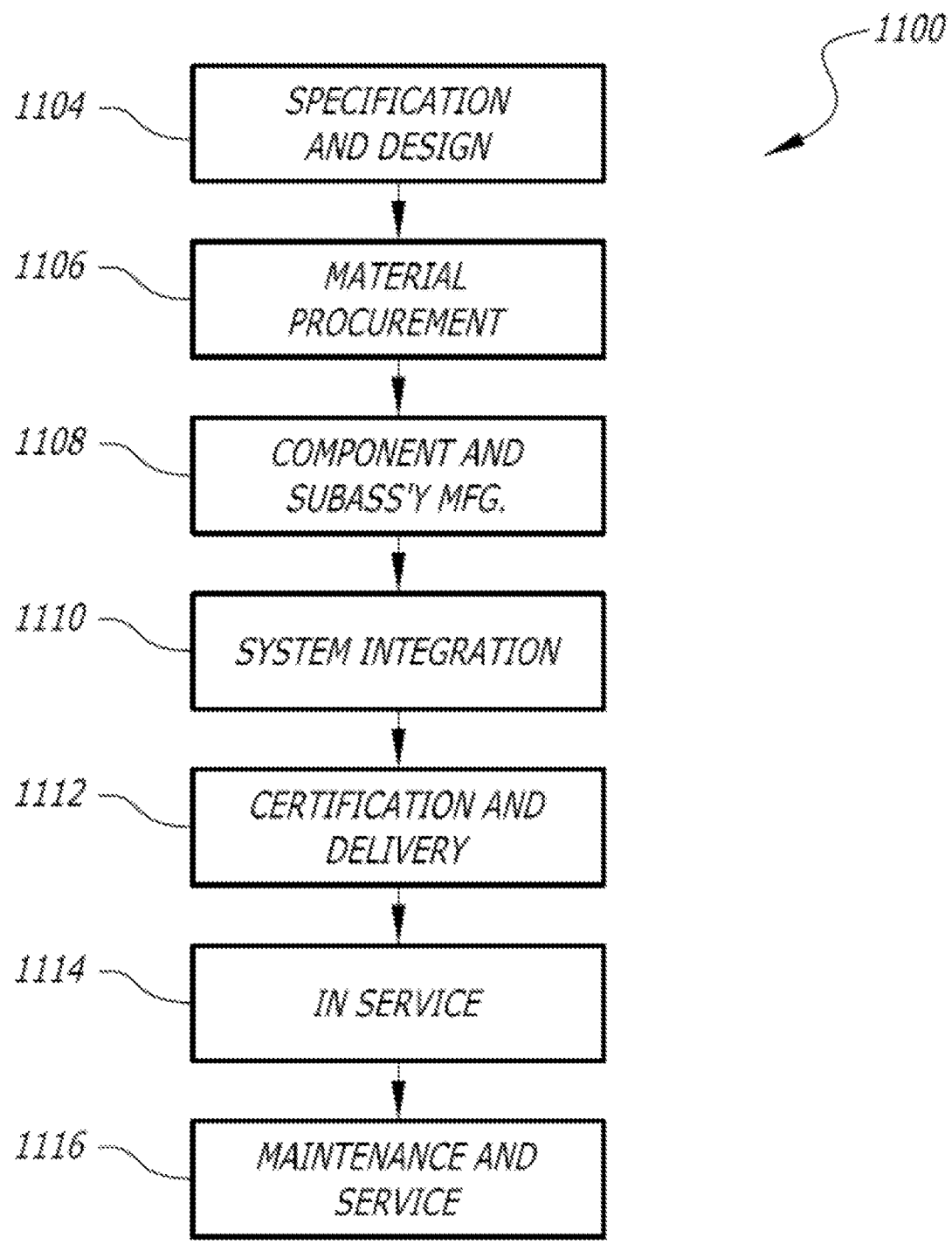
Figure 21:
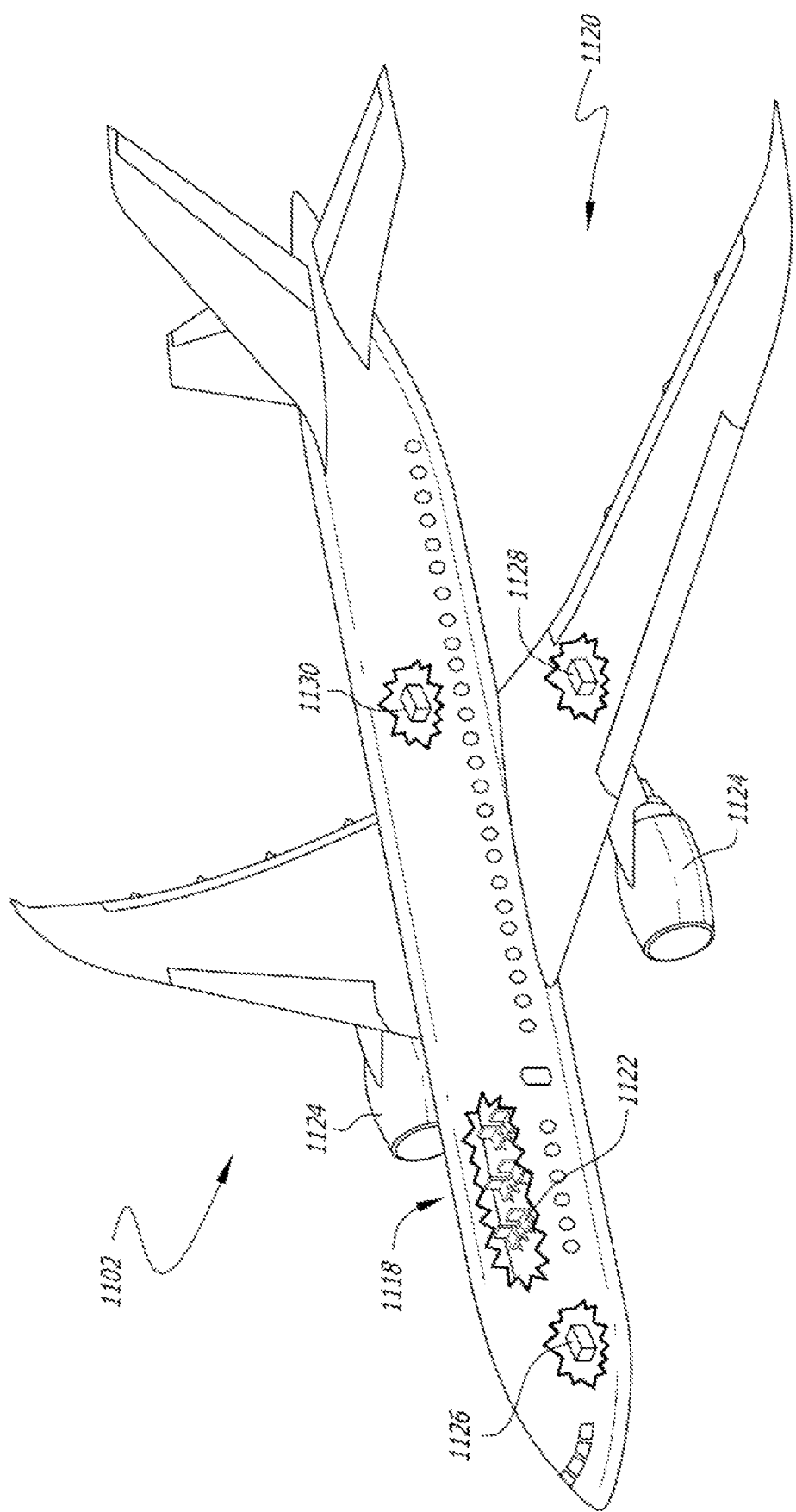

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a system for shaping an extrudable material, according to one or more examples of the present disclosure;

FIG. 2 is a schematic, top perspective view of an apparatus of the system of FIG. 1, according to one or more examples of the present disclosure;

FIG. 3 is a schematic, bottom perspective view of the apparatus of FIG. 2, according to one or more examples of the present disclosure;

FIG. 4 is a schematic, end view of the apparatus of FIG. 2, according to one or more examples of the present disclosure;

FIG. 5 is a schematic, cross-sectional view of the apparatus of FIG. 2, according to one or more examples of the present disclosure;

FIG. 6 is a schematic, end view of the apparatus of FIG. 2, according to one or more examples of the present disclosure;

FIG. 7 is a schematic, end view of the apparatus of FIG. 2, according to one or more examples of the present disclosure;

FIG. 8 is a schematic, end view of an apparatus of the system of FIG. 1, according to one or more examples of the present disclosure;

FIG. 9 is a schematic, cross-sectional view of the apparatus of FIG. 8, according to one or more examples of the present disclosure;

FIG. 10 is a schematic, side view of a sleeve of the system of FIG. 1, according to one or more examples of the present disclosure;

FIG. 11 is a schematic, side view of a sleeve of the system of FIG. 1, according to one or more examples of the present disclosure;

FIG. 12 is a schematic, side view of a sleeve of the system of FIG. 1, according to one or more examples of the present disclosure;

FIG. 13 is a schematic, side view of a sleeve of the system of FIG. 1, according to one or more examples of the present disclosure;

FIG. 14 is a schematic, end view of an apparatus of the system of FIG. 1, according to one or more examples of the present disclosure;

FIG. 15 is a schematic, cross-sectional view of an apparatus of the system of FIG. 1, according to one or more examples of the present disclosure;

FIG. 16 is a schematic, cross-sectional view of an apparatus of the system of FIG. 1, according to one or more examples of the present disclosure;

FIG. 17 is a schematic, cross-sectional view of an apparatus of the system of FIG. 1, according to one or more examples of the present disclosure;

FIG. 18(*a*) is a schematic, end view of a sleeve and a shaping ring of an apparatus of the system of FIG. 1 in a first shaped configuration, according to one or more examples of the present disclosure;

FIG. 18(*b*) is a schematic, end view of a sleeve and a shaping ring of an apparatus of the system of FIG. 1 in a second shaped configuration, according to one or more examples of the present disclosure;

FIG. 18(*c*) is a schematic, end view of a sleeve and a shaping ring of an apparatus of the system of FIG. 1 in a third shaped configuration, according to one or more examples of the present disclosure;

FIG. 19 is a block diagram of a method of shaping an extrudable material, according to one or more examples of the present disclosure;

FIG. 20 is a block diagram of aircraft production and service methodology; and FIG. 21 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIG. 19, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 19 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-9 and 14-17, apparatus 110 for shaping extrudable material 140 is disclosed. Apparatus 110 comprises sleeve 126, comprising first sleeve end 186, sleeve inlet 148 at first sleeve end 186, second sleeve end 188, opposite first sleeve end 186, and sleeve outlet 132 at second sleeve end 188. Extrudable material 140 enters sleeve 126 through sleeve inlet 148 and exits sleeve 126 through sleeve outlet 132. Apparatus 110 further comprises actuation mechanism 172, selectively operable to change at least one of a size or a shape of sleeve outlet 132. Sleeve 126 is sufficiently flexible to enable actuation mechanism 172 to change at least one of the size or the shape of sleeve outlet 132. Sleeve 126 is insufficiently stretchable to enable actuation mechanism 172 to stretch sleeve 126. The preceding subject matter of this paragraph characterizes example 1 of the present disclosure.

Use of sleeve 126 and actuation mechanism 172 provide adjustment to the size and/or shape of extrudable material 140 exiting sleeve outlet 132, and delivered to workpiece 170, during a manufacturing process, such as an additive manufacturing method. The ability to adjust the size and/or shape of extrudable material 140 from a single apparatus facilitates the formation of self-supporting, out-of-plane structures using additive manufacturing methods without the need to substitute one apparatus (e.g., nozzle) for another. In other words, selective operation of actuation mechanism 172 to change the size and/or the shape of sleeve outlet 132 facilitates on-the-fly changes to the size and/or the shape of extrudable material 140 extruded from sleeve outlet 132 in an additive manufacturing process. Additionally, use of sleeve 126 and actuation mechanism 172 allows additive manufacturing processes to form parts with higher material throughput, reduced material usage, improved interlaminar adhesion, faster print speeds, better part geometry, better surface control, and reduced post-processing steps. Furthermore, sleeve 126, being both flexible and non-stretchable, promotes changes to the size and/or the shape of extrudable material 140, while not allowing the pressure of extrudable material 140 to deform sleeve 126, which facilitates predictable and controllable flow rates of extrudable material 140 from sleeve 126.

Sleeve 126 is more flexible than support structure 115 and feed tube 112. In this manner, sleeve 126 can flex relative to support structure 115 and feed tube 112. In one example, sleeve 126 comprises a tubular mesh sleeve and a membrane, through which extrudable material 140 is impenetrable, impregnated in or lining the tubular mesh sleeve. The tubular mesh sleeve comprises an interlocking network of rigid links in some examples or braided fibers in other examples. The rigid links are made of a metal, hardened plastic, carbon fibers, or other materials that do not stretch under the pressure of extrudable material 140 advancing through sleeve 126. The membrane is made from a rubber, or other similar material, that alone is stretchable, but when coupled with the tubular mesh sleeve is not stretchable.

Extrudable material 140 is made of any of various materials capable of being extruded through sleeve 126. In one example, extrudable material 140 is made of one or more of melted plastic, resin, sealant, adhesive, or the like.

In one example, actuation mechanism 172 is selectively operable via controller 102, which can be an electronic controller, programmed to control operation of system 100, including actuation mechanism 172.

Referring generally to FIG. 1 and particularly to, e.g., FIGS. 2-9 and 14-16, actuation mechanism 172 further comprises plurality of actuators 122. Actuation mechanism also comprises plurality of cables 128, surrounding sleeve 126. Each one of plurality of cables 128 comprises first cable end 180, coupled to a corresponding one of plurality of actuators 122, and second cable end 182, opposite first cable end 180, co-movably coupled to second sleeve end 188 of sleeve 126. Each one of plurality of actuators 122 is selectively operable to pull or push a corresponding one of plurality of cables 128 to change at least one of the size or the shape of sleeve outlet 132 of sleeve 126. The preceding subject matter of this paragraph characterizes example 2 of the present disclosure, wherein example 2 also includes the subject matter according to example 1, above.

Plurality of cables 128 promotes a simple and reliable actuation method for changing the size and/or the shape of sleeve outlet 132. Additionally, because plurality of cables 128 can be flexible and cross-sectionally small, plurality of cables 128 promote flexibility in the placement and orientation of plurality of cables 128, which allows plurality of actuators 122 to be positioned away from sleeve outlet 132 if desired. Plurality of actuators 122 promote automated changing of at least one of the size or the shape of sleeve outlet 132. Furthermore, plurality of actuators 122 facilitate precise and predictable control of at least one of the size or the shape of sleeve outlet 132. Plurality of actuators 122 and plurality of cables 128 improves the adjustability of the size and/or the shape of sleeve outlet 132. Each one of plurality of cables 128 adjusts a localized portion of sleeve outlet 132, which results in a localized change in the size and/or the shape of sleeve outlet 132. The collective localized changes in the size and/or the shape of sleeve outlet 132 results in an overall change in the size and/or the shape of sleeve outlet 132. The higher the number of plurality of cables 128, the greater the customization of the size and/or the shape of sleeve outlet 132 in some examples.

Each one of plurality of actuators 122 comprises a motor, in one example. The motor is selectively operable to extend (e.g., push) and retract (e.g., pull) a corresponding one of plurality of cables 128. According to one example, the motor operates as a winch. The motor is an electric motor, pneumatic motor, hydraulic motor, electromagnetic motor, or other similar motor. According to other examples, each one of plurality of actuators 122 comprises one or more of solenoids, piezo-electric actuators, screw-type linear actuators, and the like.

According to one example, each one of plurality of cables 128 is capable of being pushed without buckling and/or pulled without stretching. In one example, each one of plurality of cables 128 is made of a metal, such as stainless steel. Furthermore, in an example, each one of plurality of cables 128 is a thin, narrow strip of spring steel.

Referring to FIG. 15, in one example, plurality of actuators 122 is mounted to support tube 116 within cavity 124 of support tube 116. Furthermore, in such an example, each one of plurality of cables 128 can be a straight, non-flexible, rod. In other examples, plurality of actuators 122 is mounted to support tube 116 on exterior surface of support tube 116, opposite cavity 124, such that plurality of cables 128 passes through support tube 116.

Referring generally to FIG. 1 and particularly to, e.g., FIGS. 2-9, 14, and 16, apparatus 110 further comprises support structure 115. Actuation mechanism 172 further comprises plurality of cable tubes 118, fixed to support structure 115. Each one of plurality of cables 128 passes through a corresponding one of plurality of cable tubes 118 from a corresponding one of plurality of actuators 122 to second sleeve end 188 of sleeve 126. Support structure 115 is more rigid than sleeve 126. The preceding subject matter of this paragraph characterizes example 3 of the present disclosure, wherein example 3 also includes the subject matter according to example 2, above.

Plurality of cable tubes 118 help to protect, guide, and prevent binding of plurality of cables 128 as they are pulled or pushed by plurality of actuators 122. Support structure 115 provides a relatively rigid framework to fix plurality of actuators 122 and plurality of cable tubes 118 relative to sleeve 126.

Each one of plurality of cable tubes 118 is longitudinally incompressible. For example, each one of plurality of cables 128 and each corresponding one of plurality of cable tubes 118 cooperatively form a so-called Bowden cable. Accordingly, in one example, each one of plurality of cable tubes comprises a housing with an inner lining, a helical winding or sheaf of metal wire, and an outer covering. In some examples, plurality of cable tubes 118 is as rigid as support structure 115.

Referring generally to FIG. 1 and particularly to, e.g., FIGS. 2-9, 14, and 16, each one of plurality of cable tubes 118 of actuation mechanism 172 is more rigid than the corresponding one of plurality of cables 128 of actuation mechanism 172. The preceding subject matter of this paragraph characterizes example 4 of the present disclosure, wherein example 4 also includes the subject matter according to example 3, above.

Plurality of cable tubes 118, being more rigid than plurality of cables 128, provide structure that help to retain plurality of cables 128 in a designated push/pull path.

Referring generally to FIG. 1 and particularly to, e.g., FIGS. 2-9, 14, and 16, support structure 115 comprises support tube 116, defining cavity 124. Sleeve 126 is within cavity 124 of support tube 116. Support tube 116 supports plurality of cable tubes 118. The preceding subject matter of this paragraph characterizes example 5 of the present disclosure, wherein example 5 also includes the subject matter according to example 3 or 4, above.

Support tube 116 provides a rigid framework to support plurality of cable tubes 118 relative to sleeve 126. Moreover, support tube 116 helps protect sleeve 126 from impacts by external objects.

As shown in FIG. 16, according to one example, actuation mechanism 172 further comprises plurality of springs 169, between second sleeve end 188 of sleeve 126 and support tube 116. Plurality of springs 169 biases second sleeve end 188 toward or away from support tube 116. In one example, each one of plurality of springs 169 is a pull spring that biases second sleeve end 188 toward support tube 116 and each one of plurality of cables 128 is a push cable that is pushed by a corresponding one of plurality of actuators 122 to move second sleeve end 188 of sleeve 126 away from support tube 116 against bias of a corresponding one of plurality of springs 169. In another example, each one of plurality of springs 169 is a push spring that biases second sleeve end 188 away from support tube 116 and each one of plurality of cables 128 is a pull cable that is pulled by a corresponding one of plurality of actuators 122 to move second sleeve end 188 of sleeve 126 toward support tube 116 against bias of a corresponding one of plurality of springs 169. In one example, each one of plurality of springs 169 is a coil spring and second cable end 182 of each one of plurality of cables 128 can be concentric with a corresponding one of plurality of springs 169.

As shown in FIG. 17, according to one example, actuation mechanism 172 comprises plurality of actuators 122 and plurality of first rods 171, each movable by a corresponding one of plurality of actuators 122. Actuation mechanism 172 also comprises plurality of rocker arms 175, each pivotally coupled to support tube 116 and each movable by a corresponding one of plurality of first rods 171. Actuation mechanism 172 additionally comprises plurality of second rods 173, each movable by a corresponding one of plurality of rocker arms 175 and each coupled to second sleeve end 188 of sleeve 126. Plurality of rockers 175 pivot in first rotational direction to facilitate movement of second sleeve end 188 of sleeve 126 toward support tube 116, and pivot in second rotational direction, opposite first rotational direction, to facilitate movement of second sleeve end 188 of sleeve 126 away from support tube 116. In one example, each one of plurality of first rods 172 is pivotably coupled to a corresponding one of plurality of rocker arms 175 by a pin. Similarly, in an example, each one of plurality of second rods 173 is pivotably coupled to a corresponding one of plurality of rocker arms 175 by a pin. Alternatively, in yet another example, plurality of first rods 172 and plurality of second rods 173 merely rest against a corresponding one of plurality of rocker arms 175, and actuation mechanism 172 further comprises plurality of springs, each interposed between support tube 116 and a corresponding one of plurality of rocker arms 175 and each biasing the corresponding one of plurality of rocker arms 175 in the second rotational direction.

Referring generally to FIG. 1 and particularly to, e.g., FIGS. 2-9, 14, and 16, support structure 115 comprises support ring 114. Support ring 114 supports plurality of actuators 122. The preceding subject matter of this paragraph characterizes example 6 of the present disclosure, wherein example 6 also includes the subject matter according to any one of examples 3 to 5, above.

Support ring 114 provides a rigid framework to support plurality of actuators 122 relative to sleeve 126. In some examples, support ring 114 also provides a rigid framework to help support plurality of cable tubes 118 relative to sleeve 126.

In one example, support tube 116 is fixed to and extends from support ring 114. Plurality of actuators 122 is fixed to an exterior surface of support ring 114. Plurality of cables 128 passes from plurality of actuators 122, through support ring 114, along exterior surface of support tube 116, and through support tube 116 before coupling to second sleeve end 188 of sleeve 126. Plurality of cable tubes 118 passes from support ring 114, along exterior surface of support tube 116, and through support tube 116 in some examples. According to one example, support ring 114 is coupled to first sleeve end 186 of sleeve 126 and plurality of cable tubes 118 passes through support tube 116 laterally adjacent second sleeve end 188 of sleeve 126.

Referring generally to FIG. 1 and particularly to, e.g., FIGS. 2-9 and 14-17, apparatus 110 further comprises feed tube 112, comprising tube inlet 120 and tube outlet 142, opposite tube inlet 120. Support structure 115 is spatially fixed relative to feed tube 112. Sleeve 126 is sealingly coupled to feed tube 112 so that sleeve inlet 148 is in communication with tube outlet 142. Feed tube 112 is more rigid than sleeve 126. The preceding subject matter of this paragraph characterizes example 7 of the present disclosure, wherein example 7 also includes the subject matter according to any one of examples 3 to 6, above.

Feed tube 112 provides a rigid framework for anchoring sleeve 126. Additionally, feed tube 112 receives extrudable material 140 from a material source and delivers extrudable material 140 to sleeve 126. Also, feed tube 112 may facilitate attachment of apparatus 110 to a system actuator configured to move apparatus 110 into material dispensing positions for dispensing extrudable material 140 from sleeve outlet 132 during an additive manufacturing process.

Referring generally to FIG. 1 and particularly to, e.g., FIGS. 5, 9, and 15, apparatus 110 further comprises compression clamp 144, coupled to sleeve 126 such that a portion of first sleeve end 186 of sleeve 126 is interposed between compression clamp 144 and feed tube 112 and the portion of first sleeve end 186 of sleeve 126 is compressed between compression clamp 144 and feed tube 112. The preceding subject matter of this paragraph characterizes example 8 of the present disclosure, wherein example 8 also includes the subject matter according to example 7, above.

Compression clamp 144 helps form a seal between sleeve 126 and feed tube 112 to prevent leakage of extrudable material 140 out from within tube channel 150 and sleeve channel 152.

In one example, compression clamp 144 comprises a band, with notches, and a captive screw that engages the notches as the captive screw rotates to tighten or loosen the band. According to an example, compression clamp 144 is a conventional hose clamp. In other examples, compression clamp 144 comprises any of various other devices, such as a cable tie, rubber band, etc., capable of compressing the portion of first sleeve end 186 against feed tube 112.

Referring generally to FIG. 1 and particularly to, e.g., FIGS. 2-9 and 14-16, extrudable material 140 advances through sleeve 126 in flow direction 184. At least a portion of second cable end 182 of each one of plurality of cables 128 is perpendicular to flow direction 184 of extrudable material 140. The preceding subject matter of this paragraph characterizes example 9 of the present disclosure, wherein example 9 also includes the subject matter according to any one of examples 2 to 10, above.

At least a portion of second cable end 182 of each one of plurality of cables 128, being perpendicular to flow direction 184 promotes movement (e.g., flexing) of a portion of sleeve outlet 132 in direction perpendicular to flow direction 184, which facilitates a change in at least one of the size or the shape of sleeve outlet 132.

Referring generally to FIG. 1 and particularly to, e.g., FIGS. 2-9, 14, and 16, at least a portion of first cable end 180 of each one of plurality of cables 128 is parallel to flow direction 184 of extrudable material 140. The preceding subject matter of this paragraph characterizes example 10 of the present disclosure, wherein example 10 also includes the subject matter according to example 9, above.

At least a portion of first cable end 180 of each one of plurality of cables 128, being parallel to flow direction 184 allows first cable end 180 of each one of plurality of cables 128 and plurality of actuators 122 to be located away from sleeve outlet 132 while promoting a narrow footprint of apparatus 110.

Referring generally to FIG. 1 and particularly to, e.g., FIGS. 2-9, 14, and 15, in a plane perpendicular to flow direction 184 of extrudable material 140, second cable end 182 of each one of plurality of cables 128 is equidistant from second cable end 182 of first directly adjacent one of plurality of cables 128 and second cable end 182 of second directly adjacent one of plurality of cables 128. The preceding subject matter of this paragraph characterizes example 11 of the present disclosure, wherein example 11 also includes the subject matter according to example 9 or 10, above.

Second cable end 182 of each one of plurality of cables 128, being equidistant from second cable end 182 of a first directly adjacent one of plurality of cables 128 and second cable end 182 of a second directly adjacent one of plurality of cables 128 in a plane perpendicular to flow direction 184 of extrudable material 140, helps promote symmetrical changes to the size and/or the shape of sleeve outlet 132 if desired.

Referring generally to FIG. 1 and particularly to, e.g., FIGS. 2-9, 14, and 15, first one of plurality of actuators 122 is selectively operable to pull first one of plurality of cables 128. Second one of plurality of actuators 122 is selectively operable to push second one of plurality of cables 128. The preceding subject matter of this paragraph characterizes example 12 of the present disclosure, wherein example 12 also includes the subject matter according to any one of examples 2 to 11, above.

Pulling one of plurality of cables 128 while pushing another one of plurality of cables 128 promotes the customization of the size and/or the shape of sleeve outlet 132.

In one example, as shown in FIG. 6, some of plurality of cables 128 are pushed in first direction 190 and others of plurality of cables 128 are pulled in second direction 192. According to some examples, actuation mechanism 172 is selectively operable to reverse direction of cables so that the one or more of plurality of cables 128 being pushed in first direction 190 are pulled in second direction 192 and one or more of plurality of cables 128 being pulled in second direction 192 are pushed in first direction 190.

Referring generally to FIG. 1 and particularly to, e.g., FIGS. 3-7 and 15, actuation mechanism 172 further comprises shaping ring 130, surrounding sleeve 126 and coupled to second sleeve end 188 of sleeve 126. Shaping ring 130 is adjustable to change at least one of the size or the shape of sleeve outlet 132. The preceding subject matter of this paragraph characterizes example 13 of the present disclosure, wherein example 13 also includes the subject matter according to any one of examples 2 to 12, above.

Shaping ring 130 facilitates a change of the size and/or the shape of sleeve outlet 132 by providing a rigid, yet rearrangeable, framework to sleeve outlet 132. For example, shaping ring 130 maintains the size and/or the shape of sleeve outlet 132 while extrudable material 140 is advanced through sleeve outlet 132.

Shaping ring 130 is more rigid than sleeve 126. In one example, shaping ring 130 is sufficiently adjustable to enable actuation mechanism 172 to change at least one of the size or the shape of sleeve outlet 132 and sufficiently rigid to retain its shape as extrudable material 140 advances through sleeve outlet 132.

In one example, second cable end 182 of each one of plurality of cables 128 is co-movably coupled to second sleeve end 188 of sleeve 126 via shaping ring 130. More specifically, second cable end 182 of each one of plurality of cables 128 is directly coupled to shaping ring 130 and shaping ring 130 is directly coupled to second sleeve end 188 of sleeve 126 such that shaping ring 130 is interposed between second cable end 182 of each one of plurality of cables 128 and second sleeve end 188 of sleeve 126.

Referring generally to FIG. 1 and particularly to, e.g., FIGS. 3-7 and 15, the size and the shape of sleeve outlet 132 correspond to a size and a shape, respectively, of shaping ring 130. The preceding subject matter of this paragraph characterizes example 14 of the present disclosure, wherein example 14 also includes the subject matter according to example 13, above.

The size and the shape of shaping ring 130 corresponding with the size and the shape of sleeve outlet 132 allows a desirable size and/or the shape of sleeve outlet 132 to be achieved by changing shaping ring 130 into the same desirable size and/or shape. Also, because shaping ring 130 acts as a barrier to prevent outward flexing of sleeve outlet 132 away from central axis 194, the size and the shape of shaping ring 130 corresponding with the size and the shape of sleeve outlet 132 helps ensure the size and/or the shape of sleeve outlet 132 is maintained while extrudable material 140 is advanced through sleeve outlet 132.

Referring generally to FIG. 1 and particularly to, e.g., FIGS. 3-7 and 15, shaping ring 130 comprises at least four links 134. Shaping ring 130 also comprises at least four pivot couplers 136, each pivotally coupling together two of at least four links 134. Each of at least four links 134 is more rigid than sleeve 126. The preceding subject matter of this paragraph characterizes example 15 of the present disclosure, wherein example 15 also includes the subject matter according to example 13 or 14, above.

At least four links 134 of shaping ring 130 enables sleeve outlet 132 to have a shape with at least four sides. Furthermore, at least four links 134, being more rigid than sleeve 126, provide a rigid framework preventing sleeve outlet 132 from further flexing. Additionally, at least four links 134 facilitate reshaping or resizing of sleeve outlet 132 as shaping ring 130 is reshaped or resized. Each of at least four pivot couplers 136 facilitates pivoting motion between two adjacent ones of four links 134. Moreover, at least four pivot couplers 136 allow any two adjacent links 134 to be pivotably movable relative to each other independently of the pivoting motion of any other two adjacent ones of four links 134.

In one example, each of four links 134 comprises two knuckle portions at opposing ends of each of four links 134. Each one of the two knuckle portions of each of four links 134 interlocks with a corresponding one of the two knuckle portions of an adjacent one of four links 134. Each of at least four pivot couplers 136 comprises a pin that passes through a corresponding one of four interlocking knuckle portions. According to one example, each one of the four interlocking knuckle portions and corresponding pin is configured like a conventional door hinge. Adjacent ones of four links 134 are able to pivot about the pivot couplers when actuated by actuation mechanism 172.

Referring generally to FIG. 1 and particularly to, e.g., FIGS. 3-7 and 15, second cable end 182 of each one of plurality of cables 128 is co-movably coupled to a corresponding one of at least four pivot couplers 136. The preceding subject matter of this paragraph characterizes example 16 of the present disclosure, wherein example 16 also includes the subject matter according to example 15, above.

Plurality of actuators 122 and plurality of cables 128 facilitate automated movement of at least four pivot couplers 136, toward and away from central axis 194, independently of each other. Independent motion of at least four pivot couplers 136 in this manner promotes customization of the size and/or the shape of sleeve outlet 132.

In one example, second cable end 182 of each one of plurality of cables is co-movably coupled to a corresponding one of at least four pivot couplers 136 with a fastener, weldment, bracket, and/or other similar coupler.

Referring generally to FIG. 1 and particularly to, e.g., FIGS. 3-7 and 15, actuators in plurality of actuators 122 and links in at least four links 134 are equal in number. Cables in plurality of cables 128 and links in at least four links 134 are equal in number. The preceding subject matter of this paragraph characterizes example 17 of the present disclosure, wherein example 17 also includes the subject matter according to example 16, above.

Having actuators in plurality of actuators 122 and links in at least four links 134 being equal in number, and cables in plurality of cables 128 and links in at least four links 134 being equal, facilitate customization of the size and/or the shape of shaping ring 130 with any given quantity of links.

Referring generally to FIG. 1 and particularly to, e.g., FIGS. 3-9, 14, and 15, actuation mechanism 172 is further selectively operable to change the shape of sleeve outlet 132 from one polygonal shape to any one of a plurality of other polygonal shapes. The preceding subject matter of this paragraph characterizes example 18 of the present disclosure, wherein example 18 also includes the subject matter according to any one of examples 1 to 17, above.

Actuation mechanism 172, being selectively operable to change the shape of sleeve outlet 132 from one polygonal shape to any one of a plurality of other polygonal shapes, allows a structure to be formed with extrudable material 140 having multiple polygonal shapes using an additive manufacturing process.

In one example, shape of sleeve outlet 132 is octagonal in FIG. 4, square in FIG. 6, and a four-point star in FIG. 7. Actuation mechanism 172 is selectively operable to alternatingly pull in first direction 190 and push in second direction 192 adjacent ones of at least four pivot couplers 136 to change the shape of sleeve outlet 132 from octagonal in FIG. 4 to square in FIG. 6. Actuation mechanism 172 is further selectively operable to alternatingly pull in first direction 190 and push in second direction 192 adjacent ones of at least four pivot couplers 136 to change the shape of sleeve outlet 132 from square in FIG. 6 to four-point start in FIG. 7.

According to one example, shape of sleeve outlet 132 is an L-shape in FIG. 18(a), a C-shape in FIG. 18(b), and an I-shape in FIG. 18(c). The variety of shapes of sleeve outlet 132, such as those shown in FIG. 18, facilitated by apparatus 110 promotes extrudate with a higher self-supporting and stiffer structure compared to conventional extrudate, which allows for out-of-plane additive manufacturing.

Referring generally to FIG. 1 and particularly to, e.g., FIGS. 3-9, 14, and 15, the one polygonal shape has a first number of sides. At least one of the plurality of other polygonal shapes has a second number of sides different than the first number of sides of the one polygonal shape. The preceding subject matter of this paragraph characterizes example 19 of the present disclosure, wherein example 19 also includes the subject matter according to example 18, above.

At least one of the plurality of other polygonal shapes having a second number of sides different than the first number of sides of the one polygonal shape allows a structure to be formed with extrudable material 140 having fundamentally different polygonal shapes using an additive manufacturing process.

As an example, the octagonal shape of sleeve outlet 132 in FIG. 4 has eight sides and the square shape of sleeve outlet 132 in FIG. 6 has four sides.

Referring generally to FIG. 1 and particularly to, e.g., FIGS. 8-13, sleeve 126 has a thickness and comprises plurality of grooves 162. Sleeve 126 further comprises plurality of sleeve segments 160. Adjacent ones of plurality of sleeve segments 160 are interconnected by a corresponding one of plurality of grooves 162. The thickness of sleeve 126 at each one of plurality of grooves 162 is less than the thickness of sleeve 126 at each one of plurality of sleeve segments 160. Sleeve 126 is more flexible along any one of plurality of grooves 162 than across any one of plurality of sleeve segments 160. The preceding subject matter of this paragraph characterizes example 20 of the present disclosure, wherein example 20 also includes the subject matter according to any one of examples 1 to 19, above.

Plurality of grooves 162 provide corresponding regions of reduced thickness of sleeve 126. The regions of reduced thickness promote flexibility, which allows adjacent ones of plurality of sleeve segments 160 to pivot relative to each other to change the size and/or the shape of sleeve outlet 132. Plurality of sleeve segments 160, being thicker than plurality of grooves 162, and thus less flexible than regions of reduced thickness provided by plurality of grooves 162, provide a strong framework for resisting deformation due to the pressure of extrudable material 140 as extrudable material 140 flows through sleeve 126.

A thickness of sleeve 126 is less along plurality of grooves 162 than along plurality of sleeve segments 160. In one example, a material of sleeve 126 is the same along plurality of grooves 162 and plurality of sleeve segments 160. The material of sleeve 126 along plurality of grooves 162 and plurality of sleeve segments 160 comprises non-porous materials, such as metal, plastic, and/or fiber-reinforced polymers, in some examples. For sleeve 126 made of a fiber-reinforced polymer along plurality of grooves 162, fibers are parallel to plurality of grooves 162.

According to one example, as shown in FIG. 13, actuation mechanism 172 of apparatus 110 does not have shaping ring 130 and sleeve 126 does not have plurality of grooves 162. In such an example, second cable end 182 of each one of plurality of cables 128 is coupled directly to sleeve 126.

Referring generally to FIG. 1 and particularly to, e.g., FIGS. 8 and 9, none of plurality of grooves 162 intersects any other one of plurality of grooves 162. The preceding subject matter of this paragraph characterizes example 21 of the present disclosure, wherein example 21 also includes the subject matter according to example 20, above.

Having none of plurality of grooves 162 intersect any other one of plurality of grooves 162 allows a shape of sleeve channel 152 of sleeve 126, at a location along central axis 194 of sleeve channel 152 away from sleeve outlet 132, to be substantially the same as at the sleeve outlet 132. Maintaining a constant shape along sleeve channel 152 can help reduce binding or build-up of extrudable material 140 in sleeve channel 152 as extrudable material 140 advances through sleeve 126.

Referring generally to, e.g., FIG. 1 and particularly to FIGS. 10-13, at least one of plurality of grooves 162 intersects at least another one of plurality of grooves 162. The preceding subject matter of this paragraph characterizes example 22 of the present disclosure, wherein example 22 also includes the subject matter according to example 20, above.

Having at least one of plurality of grooves 162 intersect at least another one of plurality of grooves 162 promotes flexibility in sleeve 126 and allows more adjustability of the size and/or the shape of sleeve outlet 132.

Referring to FIG. 11, in one example, some of plurality of grooves 162 oblique to flow direction 184 intersect some of plurality of grooves 162 parallel to flow direction 184. Referring to FIG. 12, in one example, only plurality of grooves 162, oblique to flow direction 184, intersect each other.

Referring generally to, e.g., FIG. 1 and particularly to FIGS. 8-11 and 13, extrudable material 140 advances through sleeve 126 in flow direction 184. At least some of plurality of grooves 162 are parallel to flow direction 184 of extrudable material 140. The preceding subject matter of this paragraph characterizes example 23 of the present disclosure, wherein example 23 also includes the subject matter according to any one of examples 20 to 22, above.

Plurality of grooves 162 provides an axis, about which adjacent ones of plurality of sleeve segments 160 are pivotable relative to each other. Moreover, each one of plurality of grooves 162, being parallel to flow direction 184 of extrudable material 140, provides an axis that is also parallel to flow direction 184 of extrudable material 140. The axes, being parallel to flow direction 184 of extrudable material 140, facilitates movement of plurality of grooves 162 toward and away from central axis 194 in directions perpendicular to flow direction 184 of extrudable material 140 to change the size and/or the shape of sleeve outlet 132.

Referring generally to, e.g., FIG. 1 and particularly to FIGS. 10 and 13, extrudable material 140 advances through sleeve 126 in flow direction 184. At least some of plurality of grooves 162 are perpendicular to flow direction 184 of extrudable material 140. The preceding subject matter of this paragraph characterizes example 24 of the present disclosure, wherein example 24 also includes the subject matter according to any one of examples 20 to 23, above.

One of plurality of grooves 162, being perpendicular to flow direction 184 of extrudable material 140, provides an axis that is also perpendicular to flow direction 184 of extrudable material 140. The axis, being perpendicular to flow direction 184, facilitates the necessary flexibility away from sleeve outlet 132 to accommodate movement of sleeve outlet 132 toward and away from central axis 194 in directions perpendicular to flow direction 184 to change the size and/or the shape of sleeve outlet 132.

Referring generally to, e.g., FIG. 1 and particularly to FIGS. 11-13, extrudable material 140 advances through sleeve 126 in flow direction 184. At least some of plurality of grooves 162 are oblique to flow direction 184 of extrudable material 140. The preceding subject matter of this paragraph characterizes example 25 of the present disclosure, wherein example 25 also includes the subject matter according to any one of examples 20 to 24, above.

Plurality of grooves 162, being oblique to flow direction 184, provides an axis that is also oblique to flow direction 184. The axis, being oblique to flow direction 184, facilitates movement of a portion of sleeve outlet 132 in directions perpendicular to flow direction 184, but offset from central axis 194, to change the size and/or the shape of sleeve outlet 132. Generally, plurality of grooves 162, being oblique to flow direction 184, promotes greater flexibility and further customization of the size and/or the shape of sleeve outlet 132.

Referring generally to, e.g., FIGS. 1-15 and particularly to FIG. 16, method 200 of shaping extrudable material 140 is disclosed. Method 200 comprises (block 202) advancing extrudable material 140 through sleeve 126 that comprises second sleeve end 188 and sleeve outlet 132 at second sleeve end 188. Method 200 further comprises (block 204) selectively changing at least one of a size or a shape of sleeve outlet 132. The preceding subject matter of this paragraph characterizes example 26 of the present disclosure.

The ability to selectively change the size and/or the shape of sleeve outlet 132 facilitates adjustment of the size and/or shape of extrudable material 140 delivered from a single apparatus, such as apparatus 110, which promotes the formation of self-supporting, out-of-plane structures using additive manufacturing methods without the need to substitute one nozzle for another. In other words, selective changing of the size and/or the shape of sleeve outlet 132 facilitates on-the-fly changes to the size and/or the shape of extrudable material 140 extruded from sleeve outlet 132 in an additive manufacturing process. Additionally, selectively changing at least one of the size or the shape of sleeve outlet 132 allows additive manufacturing processes to form parts with higher material throughput, reduced material usage, improved interlaminar adhesion, faster print speeds, better part geometry, better surface control, and reduced post-processing steps. Furthermore, sleeve 126, being both flexible and non-stretchable, promotes changes to the size and/or the shape of extrudable material 140, while not allowing the pressure of extrudable material 140 to deform sleeve 126, which facilitates predictable and controllable flow rates of extrudable material 140 from sleeve 126.

Referring generally to, e.g., FIGS. 1-9, 14, and 15 and particularly to FIG. 16, according to method 200, selectively changing at least one of the size or the shape of sleeve outlet 132 comprises (block 206) selectively operating plurality of actuators 122, coupled to second sleeve end 188 of sleeve 126 via plurality of cables 128. The preceding subject matter of this paragraph characterizes example 27 of the present disclosure, wherein example 27 also includes the subject matter according to example 26, above.

Selectively operating plurality of actuators 122 promotes automated changing of at least one of the size or the shape of sleeve outlet 132. Furthermore, selectively operating plurality of actuators 122 facilitates precise and predictable control of at least one of the size or the shape of sleeve outlet 132.

Referring generally to, e.g., FIGS. 1-9, 14, and 15 and particularly to FIG. 16, according to method 200, selectively operating plurality of actuators 122 comprises (block 208) pushing or pulling plurality of cables 128. The preceding subject matter of this paragraph characterizes example 28 of the present disclosure, wherein example 28 also includes the subject matter according to example 27, above.

Pushing or pulling plurality of cables 128 promotes a simple and reliable actuation method for changing at least one of the size or the shape of sleeve outlet 132.

Referring generally to, e.g., FIGS. 1-9, 14, and 15 and particularly to FIG. 16, according to method 200, extrudable material 140 advances through sleeve 126 in flow direction 184. Pushing plurality of cables 128 comprises (block 210) pushing plurality of cables 128 in first direction 190, perpendicular to flow direction 184 and toward central axis 194 of sleeve channel 152, defined by sleeve 126, to move corresponding portions of second sleeve end 188 of sleeve 126 in first direction 190. Pulling plurality of cables 128 comprises (block 212) pulling plurality of cables 128 in second direction 192, perpendicular to flow direction 184 and away from central axis 194 of sleeve channel 152, to move the corresponding portions of second sleeve end 188 of sleeve 126 in second direction 192. The preceding subject matter of this paragraph characterizes example 29 of the present disclosure, wherein example 29 also includes the subject matter according to example 28, above.

Pushing plurality of cables 128 in first direction 190 and pulling plurality of cables 128 in second direction 192 promote movement, e.g. flexing, of at least a portion of sleeve outlet 132 in direction perpendicular to flow direction 184, which facilitates a change in at least one of the size or the shape of sleeve outlet 132.

Referring generally to, e.g., FIGS. 1 and 8-13 and particularly to FIG. 16, according to method 200, sleeve 126 comprises plurality of grooves 162 and plurality of sleeve segments 160. Adjacent ones of plurality of sleeve segments 160 are pivotally coupled together by a corresponding one of plurality of grooves 162. Selectively changing at least one of the size or the shape of sleeve outlet 132 comprises (block 214) bending sleeve 126 along at least one of plurality of grooves 162 to pivot adjacent ones of plurality of sleeve segments 160, pivotally coupled together by at least the one of plurality of grooves 162, relative to each other. The preceding subject matter of this paragraph characterizes example 30 of the present disclosure, wherein example 30 also includes the subject matter according to example 28 or 29, above.

Bending sleeve 126 along plurality of grooves 162 to move plurality of sleeve segments 160 relative to each other promotes a change to the size and/or the shape of sleeve outlet 132 while providing a strong framework for resisting deformation due to the pressure of extrudable material 140 as extrudable material 140 flows through sleeve 12.

Referring generally to, e.g., FIGS. 1, 3-7, and 15 and particularly to FIG. 16, according to method 200, selectively changing at least one of the size or the shape of sleeve outlet 132 comprises (block 216) changing a size or a shape of shaping ring 130, surrounding and coupled to second sleeve end 188 of sleeve 126. Shaping ring 130 is more rigid than second sleeve end 188 of sleeve 126. The preceding subject matter of this paragraph characterizes example 31 of the present disclosure, wherein example 31 also includes the subject matter according to any one of examples 26 to 30, above.

Changing a size or a shape of shaping ring 130 facilitates a change of the size and/or the shape of sleeve outlet 132 by providing a rigid, yet rearrangeable, framework to sleeve outlet 132.

Referring generally to, e.g., FIGS. 1, 3-7, and 15 and particularly to FIG. 16, according to method 200, shaping ring 130 comprises at least four links 134, each pivotally coupled to two adjacent ones of at least four links 134. Changing the size or the shape of shaping ring 130 comprises (block 218) pivoting one of at least four links 134 relative to another one of at least four links 134. The preceding subject matter of this paragraph characterizes example 32 of the present disclosure, wherein example 32 also includes the subject matter according to example 31, above.

Pivoting links, such as at least four links 134, relative to each other enables a simple and reliable actuation method for changing at least one of the size or the shape of sleeve outlet 132.

Referring generally to, e.g., FIGS. 1-15 and particularly to FIG. 16, method 200 further comprises (block 222) advancing extrudable material 140 through sleeve 126 while at least the one of the size or the shape of sleeve outlet 132 is selectively changed. The preceding subject matter of this paragraph characterizes example 33 of the present disclosure, wherein example 33 also includes the subject matter according to any one of examples 26 to 32, above.

Selectively changing the size and/or the shape of sleeve outlet 132 while advancing extrudable material 140 through sleeve 126 facilitates on-the-fly changes to the size and/or the shape of extrudable material 140 extruded from sleeve outlet 132 in an additive manufacturing process.

Referring generally to, e.g., FIG. 1 and particularly to FIG. 16, method 200 further comprises (block 224) automatically selectively changing at least the one of the size or the shape of sleeve outlet 132 using controller 102. The preceding subject matter of this paragraph characterizes example 34 of the present disclosure, wherein example 34 also includes the subject matter according to any one of examples 26 to 33, above.

Automatically selectively changing the size and/or the shape of sleeve outlet 132 using controller 102 facilitates precise and predictable control of at least one of the size or the shape of sleeve outlet 132. Also, using controller 102 to automatically selectively change the size and/or the shape of sleeve outlet 132 facilitates the use of numerically-controlled machines and associated software to execute an additive manufacturing process.

Referring generally to, e.g., FIGS. 1-15 and particularly to FIG. 16, according to method 200, selectively changing at least the one of the size or the shape of sleeve outlet 132 comprises (block 220) flexing sleeve outlet 132. The preceding subject matter of this paragraph characterizes example 35 of the present disclosure, wherein example 35 also includes the subject matter according to any one of examples 26 to 34, above.

Flexing sleeve outlet 132 to change the size and/or the shape of sleeve outlet 132 provides a reliable and repeatable method for changing the size and/or the shape of extrudable material 140 when forming a part using an additive manufacturing process.

Examples of the present disclosure may be described in the context of aircraft manufacturing and service method 1100 as shown in FIG. 20 and aircraft 1102 as shown in FIG. 21. During pre-production, illustrative method 1100 may include specification and design (block 1104) of aircraft 1102 and material procurement (block 1106. During production, component and subassembly manufacturing (block 1108) and system integration (block 1110) of aircraft 1102 may take place. Thereafter, aircraft 1102 may go through certification and delivery (block 1112 to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 21, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108 may be fabricated or manufactured in a manner similar to components or subassemblies produced while aircraft 1102 is in service (block 1114. Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114 and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for shaping an extrudable material the apparatus comprising:
   a sleeve, comprising a first sleeve end, a sleeve inlet at the first sleeve end, a second sleeve end, opposite the first sleeve end, and a sleeve outlet at the second sleeve end, wherein the extrudable material enters the sleeve through the sleeve inlet and exits the sleeve through the sleeve outlet; and
   an actuation mechanism, selectively operable to change at least one of a size or a shape of the sleeve outlet,
   wherein:
      the sleeve is sufficiently flexible to enable the actuation mechanism to change at least one of the size or the shape of the sleeve outlet; and
      the sleeve is insufficiently stretchable to enable the actuation mechanism to stretch the sleeve;
      the actuation mechanism further comprises:
         a plurality of actuators; and
         a plurality of cables, surrounding the sleeve;
      each one of the plurality of cables comprises a first cable end, coupled to a corresponding one of the plurality of actuators, and a second cable end, opposite the first cable end, co-movably coupled to the second sleeve end of the sleeve;
      each one of the plurality of actuators is selectively operable to pull or push a corresponding one of the plurality of cables to change at least one of the size or the shape of the sleeve outlet of the sleeve;

the apparatus further comprises a support structure;
the actuation mechanism further comprises a plurality of cable tubes, fixed to the support structure;
each one of the plurality of cables passes through a corresponding one of the plurality of cable tubes from a corresponding one of the plurality of actuators to the second sleeve end of the sleeve; and
the support structure is more rigid than the sleeve.

2. The apparatus according to claim 1, wherein each one of the plurality of cable tubes of the actuation mechanism is more rigid than the corresponding one of the plurality of cables of the actuation mechanism.

3. The apparatus according to claim 1, wherein the support structure comprises a support tube, defining a cavity, wherein:
the sleeve is within the cavity of the support tube; and
the support tube supports the plurality of cable tubes.

4. The apparatus according to claim 1 wherein:
the support structure comprises a support ring; and
the support ring supports the plurality of actuators.

5. The apparatus according to claim 1, further comprising a feed tube, comprising a tube inlet and a tube outlet, opposite the tube inlet, wherein:
the support structure is spatially fixed relative to the feed tube;
the sleeve is sealingly coupled to the feed tube so that the sleeve inlet is in communication with the tube outlet; and
the feed tube is more rigid than the sleeve.

6. The apparatus according to claim 5, further comprising a compression clamp, coupled to the sleeve such that:
a portion of the first sleeve end of the sleeve is interposed between the compression clamp and the feed tube; and
the portion of the first sleeve end of the sleeve is compressed between the compression clamp and the feed tube.

7. The apparatus according to claim 1, wherein:
the extrudable material advances through the sleeve in a flow direction; and
at least a portion of the second cable end of each one of the plurality of cables is perpendicular to the flow direction of the extrudable material.

8. The apparatus according to claim 1, wherein:
a first one of the plurality of actuators is selectively operable to pull a first one of the plurality of cables; and
a second one of the plurality of actuators is selectively operable to push a second one of the plurality of cables.

9. The apparatus according to claim 1, wherein:
the actuation mechanism further comprises a shaping ring, surrounding the sleeve and coupled to the second sleeve end of the sleeve; and
the shaping ring is adjustable to change at least one of the size or the shape of the sleeve outlet.

10. The apparatus according to claim 9, wherein the shaping ring comprises:
at least four links; and
at least four pivot couplers, each pivotally coupling together two of at least the four links; and
wherein each of at least the four links is more rigid than the sleeve.

11. The apparatus according to claim 10, wherein the second cable end of each one of the plurality of cables is co-movably coupled to a corresponding one of at least the four pivot couplers.

12. The apparatus according to claim 1, wherein the sleeve has a thickness and comprises:
a plurality of grooves; and
a plurality of sleeve segments; and
wherein:
adjacent ones of the plurality of sleeve segments are interconnected by a corresponding one of the plurality of grooves;
the thickness of the sleeve at each one of the plurality of grooves is less than the thickness of the sleeve at each one of the plurality of sleeve segments; and
the sleeve is more flexible along any one of the plurality of grooves than across any one of the plurality of sleeve segments.

13. The apparatus according to claim 12, wherein none of the plurality of grooves intersects any other one of the plurality of grooves.

14. The apparatus according to claim 12, wherein at least one of the plurality of grooves intersects at least another one of the plurality of grooves.

15. The apparatus according to claim 12, wherein:
the extrudable material advances through the sleeve in a flow direction; and
at least some of the plurality of grooves are parallel to the flow direction of the extrudable material.

16. The apparatus according to claim 12, wherein:
the extrudable material advances through the sleeve in a flow direction; and
at least some of the plurality of grooves are perpendicular to the flow direction of the extrudable material.

17. The apparatus according to claim 12, wherein:
the extrudable material advances through the sleeve in a flow direction; and
at least some of the plurality of grooves are oblique to the flow direction of the extrudable material.

18. The apparatus according to claim 1, wherein the actuation mechanism is further selectively operable to change the shape of the sleeve outlet from one polygonal shape to any one of a plurality of other polygonal shapes.

19. The apparatus according to claim 7, wherein at least a portion of the first cable end of each one of the plurality of cables is parallel to the flow direction of the extrudable material.

20. The apparatus according to claim 7, wherein, in a plane, perpendicular to the flow direction of the extrudable material, the second cable end of each one of the plurality of cables is equidistant from the second cable end of a first directly adjacent one of the plurality of cables and the second cable end of a second directly adjacent one of the plurality of cables.

* * * * *